(12) United States Patent
Hostyn et al.

(10) Patent No.: US 11,912,148 B2
(45) Date of Patent: Feb. 27, 2024

(54) METHOD OF EFFICIENTLY MANAGING ENERGY

(71) Applicant: SONY CORPORATION, Tokyo (JP)

(72) Inventors: Tom Hostyn, Halle (BE); Philip Marivoet, Tienen (BE); Yoeri Apts, Zemst (BE); Christopher Rutherford, Shaerbeek (BE); Vanessa Schelkens, Heverlee (BE); Dimitri Torfs, Winksele (BE); Francis Van Aeken, Brussels (BE)

(73) Assignee: SONY CORPORATION, Tokyo (JP)

( * ) Notice: Subject to any disclaimer, the term of this patent is extended or adjusted under 35 U.S.C. 154(b) by 925 days.

(21) Appl. No.: 14/735,540

(22) Filed: Jun. 10, 2015

(65) Prior Publication Data

US 2015/0266391 A1    Sep. 24, 2015

Related U.S. Application Data

(63) Continuation of application No. 13/164,758, filed on Jun. 20, 2011, now abandoned, which is a (Continued)

(30) Foreign Application Priority Data

Jan. 25, 2010 (JP) ................ 2010-013690

(51) Int. Cl.
*B60L 53/30* (2019.01)
*H02J 3/32* (2006.01)
(Continued)

(52) U.S. Cl.
CPC ............ *B60L 53/305* (2019.02); *B60L 3/12* (2013.01); *B60L 15/2045* (2013.01);
(Continued)

(58) Field of Classification Search
CPC ........ B06L 53/305; B06L 53/64; B06L 58/12; G06Q 10/06; G06Q 30/0202; G06Q 50/06
(Continued)

(56) References Cited

U.S. PATENT DOCUMENTS 5,134,944 A * 8/1992 Keller ............... C03B 5/005
110/234
5,539,399 A * 7/1996 Takahira ............ G01C 21/3469
340/636.1
(Continued)

FOREIGN PATENT DOCUMENTS

EP    1 263 108 A1    12/2002
EP    1 275 936 A2     1/2003
(Continued)

OTHER PUBLICATIONS

Lampropoulos, I, G M A Vanalme, and W L Kling. "A Methodology for Modeling the Behavior of Electricity Prosumers Within the Smart Grid." 2010 IEEE PES Innovative Smart Grid Technologies Conference Europe (ISGT Europe). IEEE, 2010. 1-8. Web. (Year: 2010).*

(Continued)

*Primary Examiner* — Akiba K Robinson
(74) *Attorney, Agent, or Firm* — XSENSUS LLP

(57) ABSTRACT

A method is provided for managing energy. The method comprises collecting information relating to amounts of energy stored by a plurality of members of a group, and relating to energy requirements of the members. The method further comprises determining a price for distributing energy to a non-member of the group, determining whether to supply energy stored by the members to the non-member at the determined price, and issuing instructions to distribute
(Continued)

energy upon determining that energy stored by the plurality of members should be supplied to the non-member.

20 Claims, 19 Drawing Sheets

Related U.S. Application Data continuation of application No. PCT/JP2011/000229, filed on Jan. 18, 2011.

(51) Int. Cl.
| | |
|---|---|
| G06Q 50/06 | (2012.01) |
| G06Q 30/0202 | (2023.01) |
| G06Q 10/06 | (2023.01) |
| H02J 3/00 | (2006.01) |
| B60L 15/20 | (2006.01) |
| B60L 3/12 | (2006.01) |
| B60L 53/64 | (2019.01) |
| B60L 50/20 | (2019.01) |
| B60L 53/63 | (2019.01) |
| B60L 58/12 | (2019.01) |
| B60L 53/65 | (2019.01) |
| H02J 13/00 | (2006.01) |
| H02J 3/38 | (2006.01) |
| G01C 21/36 | (2006.01) |

(52) U.S. Cl.
CPC .............. *B60L 50/20* (2019.02); *B60L 53/63* (2019.02); *B60L 53/64* (2019.02); *B60L 53/65* (2019.02); *B60L 58/12* (2019.02); *G01C 21/362* (2013.01); *G06Q 10/06* (2013.01); *G06Q 30/0202* (2013.01); *G06Q 50/06* (2013.01); *H02J 3/008* (2013.01); *H02J 3/32* (2013.01); *H02J 3/381* (2013.01); *H02J 13/00002* (2020.01); *B60L 2200/12* (2013.01); *B60L 2210/20* (2013.01); *B60L 2240/622* (2013.01); *B60L 2240/72* (2013.01); *B60L 2250/12* (2013.01); *B60L 2250/16* (2013.01); *B60L 2260/50* (2013.01); *B60L 2260/52* (2013.01); *B60L 2260/54* (2013.01); *H02J 2300/24* (2020.01); *H02J 2300/28* (2020.01); *Y02E 10/56* (2013.01); *Y02E 10/76* (2013.01); *Y02E 60/00* (2013.01); *Y02E 70/30* (2013.01); *Y02T 10/64* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01); *Y04S 50/10* (2013.01); *Y04S 50/14* (2013.01)

(58) Field of Classification Search
USPC .................... 705/13, 1.1, 7.11, 412; 701/22
See application file for complete search history.

(56) References Cited

U.S. PATENT DOCUMENTS

| | | | |
|---|---|---|---|
| 6,166,449 A | 12/2000 | Takaoka et al. | |
| 6,948,461 B1* | 9/2005 | Kotwicki | F01L 9/04 |
| | | | 123/90.11 |
| 7,072,762 B2* | 7/2006 | Minami | G01F 9/023 |
| | | | 701/123 |
| 2002/0041126 A1 | 4/2002 | Provanzana et al. | |
| 2003/0006914 A1 | 1/2003 | Todoriki et al. | |
| 2003/0047209 A1 | 3/2003 | Yanai et al. | |
| 2006/0010867 A1* | 1/2006 | Shaw | F03G 6/065 |
| | | | 60/641.8 |
| 2006/0158037 A1 | 7/2006 | Danley et al. | |
| 2008/0167931 A1 | 7/2008 | Gerstemeier et al. | |
| 2008/0203973 A1* | 8/2008 | Gale | B60L 53/14 |
| | | | 320/157 |
| 2008/0319596 A1 | 12/2008 | Yamada | |
| 2010/0048236 A1 | 2/2010 | Higuchi et al. | |
| 2010/0138066 A1 | 6/2010 | Kong | |
| 2010/0161217 A1* | 6/2010 | Yamamoto | B60L 3/0046 |
| | | | 701/408 |
| 2010/0187045 A1 | 7/2010 | Ishikawa | |
| 2011/0006741 A1* | 1/2011 | Ando | H02J 7/0013 |
| | | | 320/162 |
| 2012/0203387 A1* | 8/2012 | Takayama | H02J 3/386 |
| | | | 700/291 |
| 2017/0054296 A1* | 2/2017 | Daniel | H02J 4/00 |

FOREIGN PATENT DOCUMENTS

| | | | |
|---|---|---|---|
| EP | 1 487 079 A2 | 12/2004 | |
| EP | 1 842 758 A1 | 10/2007 | |
| EP | 2 172 740 A1 | 4/2010 | |
| EP | 1 487 079 A3 | 6/2013 | |
| JP | 2002-297951 | 10/2002 | |
| JP | 2002-297951 A | 10/2002 | |
| JP | 2003-316922 | 11/2003 | |
| JP | 2004-015882 | 1/2004 | |
| JP | 2005-102364 | 4/2005 | |
| JP | 2005-102364 A | 4/2005 | |
| JP | 3669702 B2 * | 7/2005 | ............ G06Q 10/10 |
| JP | 2006-112932 A | 4/2006 | |
| JP | 2006-331405 | 12/2006 | |
| JP | 2006-331405 A | 12/2006 | |
| JP | 2007-129873 | 5/2007 | |
| JP | 2008-109849 | 5/2008 | |
| JP | 2010-512727 A | 4/2010 | |
| JP | 2011142779 A * | 7/2011 | |
| WO | WO 02/029514 A2 | 4/2002 | |
| WO | WO 2008-073453 | 6/2008 | |
| WO | WO-2012004897 A1 * | 1/2012 | ............ B60L 11/184 |

OTHER PUBLICATIONS

Karnouskos, S. "Demand Side Management via Prosumer Interactions in a Smart City Energy Marketplace." 2011 2nd IEEE PES International Conference and Exhibition on Innovative Smart Grid Technologies. IEEE, 2011. 1-7. Web. (Year: 2011).*

Vogt, Harald et al. "Market-Based Prosumer Participation in the Smart Grid." 4th IEEE International Conference on Digital Ecosystems and Technologies. IEEE, 2010. 592-597. Web. (Year: 2010).*

Office Action dated Dec. 3, 2013 in Japanese Patent Application No. 2010-013690 (with English language translation).

Extended European Search Report dated Dec. 7, 2015 in Patent Application No. 15173916.6.

Extended European Search Report dated Dec. 7, 2015 in Patent Application No. 11734489.5.

* cited by examiner (*) MIN FOOTPRINT : MINIMUM AMOUNT OF $CO_2$ EMISSION

METHOD OF EFFICIENTLY MANAGING ENERGY

CROSS-REFERENCE TO RELATED APPLICATIONS

This application is a continuation of U.S. application Ser. No. 13/164,758, filed Jun. 20, 2011, the entire contents of which are incorporated herein by reference. U.S. application Ser. No. 13/164,758 is a National Stage continuation of PCT/JP201 1/000229, filed Jan. 18, 2011, and claims the benefit of priority under 35 U.S.C. § 119 of Japanese Application No. 2010-013690, filed Jan. 25, 2010.

TECHNICAL FIELD

The present invention relates to a method of efficiently managing energy.

BACKGROUND ART

In recent years, a technology called a smart grid has gained attention. The smart grid is a technical framework to realize efficient energy usage by constructing a new transmission network having a communication channel along with the transmission network and using the intelligent transmission network. The idea of the smart grid, as a background, is to realize efficient management of energy usage, swift handling of an incident when such an incident occurs, remote control of energy usage, distributed energy generation using energy generation facilities outside the control of an energy company, or charging management of an electric vehicle. Particularly, effective utilization of in-house energy generating stations using renewable energy by ordinary households or operators other than energy companies and charging management of various motor-driven movable bodies typically including electric vehicles have attracted considerable attention. Incidentally, renewable energy is energy generated without using fossil fuel.

Energy generated by ordinary households or operators other than energy companies is used by energy generation operators. Excessive energy after being used by the energy generation operators is currently purchased by energy companies. However, purchasing energy supplied from energy generation facilities outside the control of an energy company is a heavy burden to the energy company. For example, amount of energy supplied from photovoltaic energy generation facilities depends on the weather. Moreover, amount of energy supplied from in-house energy generating stations of ordinary households depends on energy usage of ordinary households that largely changes day by day. Thus, it is difficult for energy 'companies to receive stable energy supply from energy generation facilities outside the control of energy companies. For the above reason, it may be difficult for energy companies to purchase energy in the future.

Thus, a home battery initiative that uses energy generated by energy generation facilities outside the control of energy companies after being temporarily stored in batteries has recently gained attention. For example, a method of using energy generated by photovoltaic energy generation facilities by storing such energy in batteries and making up for shortages in the night or when the weather is bad is considered. Further, methods of limiting amount of energy received from an energy company in accordance with the battery storage amount and using energy stored in batteries in the daytime when energy rates are higher by storing energy in batteries supplied by an energy company in the night when energy rates are lower are considered. Batteries can store energy as DC, which eliminates the need for DC/AC conversion or AC/DC conversion during transmission so that losses during conversion can be reduced.

Thus, various expectations regarding energy management mingle with one another amid the smart grid initiative. To realize such energy management, the smart grid initiative is premised on having a communication channel along with a transmission network. That is, exchanging information about energy management by using the intelligent transmission network is assumed. However, in a region where a communication infrastructure has been built, instead of using a transmission network as a communication channel, information about energy management may be exchanged by using a network constructed by the deployed communication infrastructure. That is, what is important in the smart grid initiative is how efficiently to use energy generation facilities and storage facilities that are not managed in a unified manner.

In Patent Document I shown below, for example, a technology that detects a current waveform of a current consumed by each electronic device or the like as a characteristic amount from a plurality of electronic devices and sends the characteristic amount to a server is disclosed. Further, a technology by which a server that received a characteristic amount identifies individual electronic devices by comparing the received characteristic amount with characteristic quantities registered with a database in advance is disclosed. In the smart grid initiative, for example, energy supply control to the electronic device identified in this manner is exercised or information about energy consumption of electronic devices is collected.

CITATION LIST

Patent Literature

[PTL 1]
Japanese Patent Application Laid-Open No. 2008-109849

Technical Problem

However, when a user generates energy derived from renewable energy in the smart grid initiative, a concrete management method of whether it is more efficient to accumulate surplus energy for use or to sell energy is still unclear. Moreover, small-scale energy producers, consumers, and combined consumers/producers (hereafter referred to as "prosumers") have doubts about whether it is more efficient to be under the energy supply management of energy under the control of an energy supplier such as an energy company or to manage energy independently. Further, doubts about how to acquire information to reduce energy costs and whether such information can easily be acquired are present among users. In addition, users have deep doubts about what kind of energy management is preferable for individual users or each region, or worldwide.

The present invention has been made in view of the above issues and it is desirable to provide a novel and improved method of efficiently managing energy capable of realizing more efficient energy management by controlling a set of small-scale energy producers, consumers, and prosumers.

Solution to Problem

Accordingly, one aspect is directed to a method of managing energy. The method may comprise collecting information relating to amounts of energy stored by a plurality of members of a group, and relating to energy requirements of the members. The method may further comprise determining a price for distributing energy to a non-member of the group, determining whether to supply energy stored by the members to the non-member at the determined price, and issuing instructions to distribute energy upon determining that energy stored by the plurality of members should be supplied to the non-member.

Another aspect is directed to an apparatus for managing energy. The apparatus may comprise a collecting unit for collecting information relating to amounts of energy stored by a plurality of members of a group, and relating to energy requirements of the members. The apparatus may further comprise a prediction unit for determining a price for distributing energy to a non-member of the group. The apparatus may also comprise a managing unit for determining whether to supply energy stored by the members to the non-member at the determined price, and issuing instructions to distribute energy upon determining that energy stored by the plurality of members should be supplied to the non-member.

Another aspect is directed to a computer-readable storage medium storing instructions which, when executed by a processor, cause a computer to perform a method. The method may comprise collecting information relating to amounts of energy stored by a plurality of members of a group, and relating to energy requirements of the members. The method may further comprise determining a price for distributing energy to a non-member of the group, determining whether to supply energy stored by the members to the non-member at the determined price, and issuing instructions to distribute energy upon determining that energy stored by the plurality of members should be supplied to the non-member.

Yet another aspect is directed to method for transmitting energy by a member of an group of energy consumers. The method may comprise determining an amount of energy generated by a generating unit associated with the member. The method may further comprise issuing instructions to store unused generated energy in an energy storage unit associated with the member, and transmitting, in response to a request, information regarding the amount of stored energy in the energy storage device, and the energy requirements of the member. The method may also comprise receiving transmission instructions from a transmission controller, and distributing energy in accordance with the transmission instructions to a non-member of the group.

Accordingly, more efficient energy management can be realized by controlling a set of small-scale energy producers, consumers, and prosumers.

DESCRIPTION OF EMBODIMENTS

Figure 1:
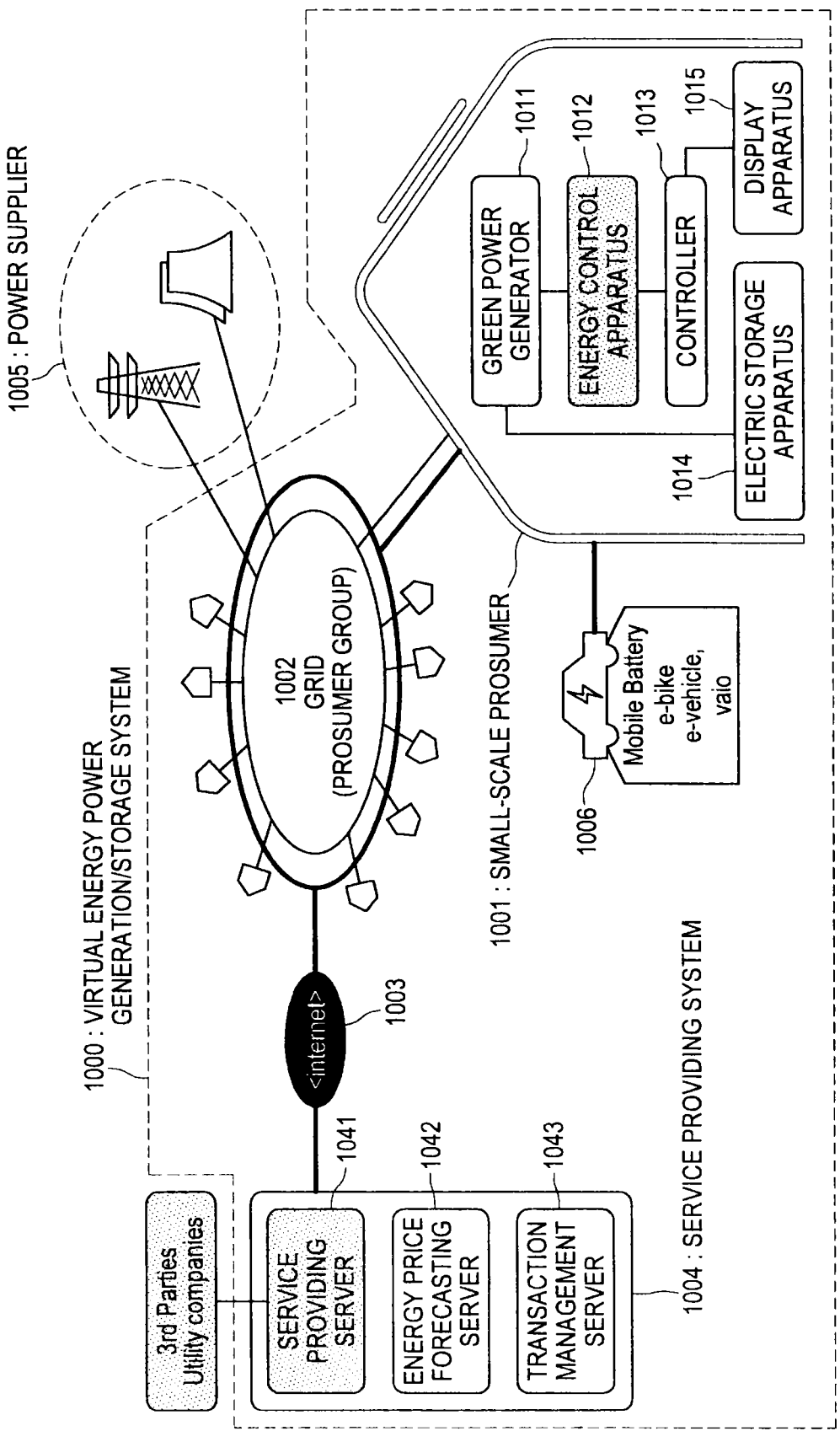
FIG. 1 is an explanatory view showing a configuration example of a virtual energy generation/storage system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(Explanation Items)
1: First Embodiment
1-1: Configuration of Virtual Energy Generation/Storage System 1000
1-1-1: Small-scale prosumers 1001
1-1-2: Service providing system 1004
1-2: Energy Management Method Using Electronic Vehicle 1016
2: Second Embodiment
2-1: Configuration of Energy Management System
2-1-1: Analyzer
2:1-2: Recommended service
3: Third Embodiment
4: Hardware Configuration Example I. First Embodiment First, a first embodiment will be described. The present embodiment is directed to energy management of an aggregate formed of small-scale energy producers, consumers, and "prosumers" (that is, a combined consumer and producer, or a microgrid) and an energy transaction method in a microgrid. Particularly, the present embodiment is concerned with a mechanism by which green energy produced and stored by small-scale prosumer or the like are bundled to realize an energy generation/storage mechanism of green energy and in which energy transactions are carried out. If the expression of "green energy" or "green energy" is used herein, the expression means energy or energy derived from renewable energy or energy or energy generated by using resources of low environmental load.

While the configuration of the virtual energy generation/storage system 1000 shown in FIG. 1 will be described in detail below as an example of a virtual energy generation/storage function of green energy, motivation leading to the invention of the above mechanism will be first summarized in brief. A prosumer has an energy generation unit. However, an energy generation unit that generates energy derived from renewable energy is assumed here. Such an energy generation unit continues to generate energy if energy generation conditions are met regardless of whether the prosumer uses energy thereof. Thus, if the prosumers do not use energy, energy generated by the energy generation unit will be wasted. Therefore, the prosumer desires to effectively use energy generated under the circumstances when energy is not used.

One method of effectively using energy generated under the circumstances when the prosumer does not use energy is to provide an accumulation unit to accumulate energy generated by the energy generation unit therein while no energy is used. Another method thereof is to sell energy generated by the energy generation unit while no energy is used to an energy company or the like. Here, the prosumer considers whether it is more efficient to accumulate energy generated by the energy generation unit while no energy is used and to use the energy later or to sell energy to an energy company or the like, but it is difficult to find the best method.

When energy is sold to an energy company or the like, transactions are often carried out based on an energy rate determined by an energy company or the like, which could result in sales of energy at an unreasonably low price.

In view of such circumstances, the inventors of the present invention invented a mechanism by which small-scale prosumers are grouped to enable transactions in the group. The very mechanism is the virtual energy generation/storage system 1000. Thus, by grouping small-scale prosumers to enable exchanges of energy in the group, energy of a prosumer can be sold to other prosumers while the prosumer does not use energy or the prosumer can receive energy of other prosumers while the other prosumers do not user energy. By enabling supply and reception of energy between prosumers in this manner, it is assumed to be able to sell energy at a price higher or to purchase energy at a price lower than an energy rate determined by an energy company or the like as well as wasting no energy generated by the energy generation unit.

(1-1: Configuration of Virtual Energy Generation/Storage System 1000)

The configuration of the virtual energy generation/storage system 1000 according to the present embodiment will be described below with reference to FIG. 1. FIG. 1 is an explanatory view showing a configuration example of the virtual energy generation/storage system 1000 according to the present embodiment.

As shown in FIG. 1, the virtual energy generation/storage system 1000 is constituted of the small-scale prosumers 1001, a prosumer group 1002, a wide-area network 1003, and the service providing system 1004. The prosumer group 1002 is an aggregate of a plurality of small-scale prosumers 1001 mutually connected by a communication network and an energy grid. While the prosumer group 1002 and the small-scale prosumers 1001 are separately shown in the example in FIG. 1, the small-scale prosumers 1001 actually constitute members of the prosumer group 1002.

An energy supplier 1005 is present outside the virtual energy generation/storage system 1000 and the prosumer group 1002 can receive energy from the energy supplier 1005. The wide-area network 1003 is an information network such as the Internet. The energy supplier 1005 is an energy company or the like.

In the virtual energy generation/storage system 1000, energy inside the prosumer group 1002 is managed by the service providing system 1004. For example, the service providing system 1004 adds the small-scale prosumer 1001 to the prosumer group 1002 or deletes the small-scale prosumer 1001 from the prosumer group 1002.

The service providing system 1004 also carries out energy transactions of energy stored by the predetermined small-scale prosumer 1001 or arbitrary energy stored inside the prosumer group 1002. For example, the service providing system 1004 sells energy, stored by the predetermined small-scale prosumer 1001 or arbitrary energy stored inside the prosumer group 1002 when the energy rate is at a peak price, to non-members of prosumer group 1002.

The service providing system 1004 also manages purchases and sales of energy, and exchanges (distribution) of energy between members inside the prosumer group 1002. That is, the service providing system 1004 provides energy transaction service inside the prosumer group 1002, where a member may receive energy from another member for storing. Incidentally, the service providing system 1004 may be configured to be able to purchase or sell energy on the energy transaction market outside the virtual energy generation/storage system 1000 or with the energy supplier 1005. Further, the service providing system 1004 may provide a prediction service of the energy rate.

In the foregoing, the configuration of the virtual energy generation/storage system 1000 has been described.

(1-1-1: Small-Scale Prosumers 1001)

The small-scale prosumer 1001 will be described in more detail. As shown in FIG. 1, the small-scale prosumer 1001 includes a green generator 1011, an energy control apparatus 1012, a controller 1013, an accumulation apparatus 1014, and a display unit 1015.

The green generator 1011 is an energy generation unit that generates energy derived from renewable energy or an energy generation unit that generates energy by using resources of low environmental load. Examples of the green generator 1011 include, for example, photovoltaic energy generators, wind turbine generators, geothermal energy generators, fuel cells, biomass energy generators, and atomic energy generators.

The energy control apparatus 1012 stores energy generated by the green generator 1011 in the accumulation apparatus 1014, transmits energy generated by the green generator 1011 to the other small-scale prosumers 1001, or transmits energy generated by the green generator 1011 to non-members of the prosumer group 1002. The energy control apparatus 1012 also transmits energy stored in the accumulation apparatus 1014 to the other small-scale prosumers 1001, to energy supplier 1005, and to a non-member of the prosumer group 1002. The energy control apparatus 1012 may determine an amount of energy generated by the green generator 1011, and may store unused generated energy in accumulation apparatus 1014. Energy control apparatus 1012 also controls charging and discharging of batteries of the electronic vehicle 1016 in the same manner as the accumulation apparatus 101.4. However, the operation of the energy control apparatus 1012 is controlled by the controller 1013.

The controller 1013 receives instructions and determines a transmission destination of energy by the energy control apparatus 1012 or controls the energy control apparatus 1012 so that energy is transmitted to the transmission destination. The controller 1013 also has a function of communicating with the service providing system 1004. Responsive to a request for information from the service providing system 1004, the controller 1013 transmits information such as an amount of energy generated by the green generator 1011, an amount of accumulated energy stored in the accumulation apparatus 1014, or energy requirements of small-scale prosumer 1001 to the service providing system 1004. Upon receiving an instruction from the service providing system 1004, controller 1013 may control the energy control apparatus 1012 to transmit energy to a non-member of prosumer group 1002 at a location designated by a received transmission destination.

Figure 2:
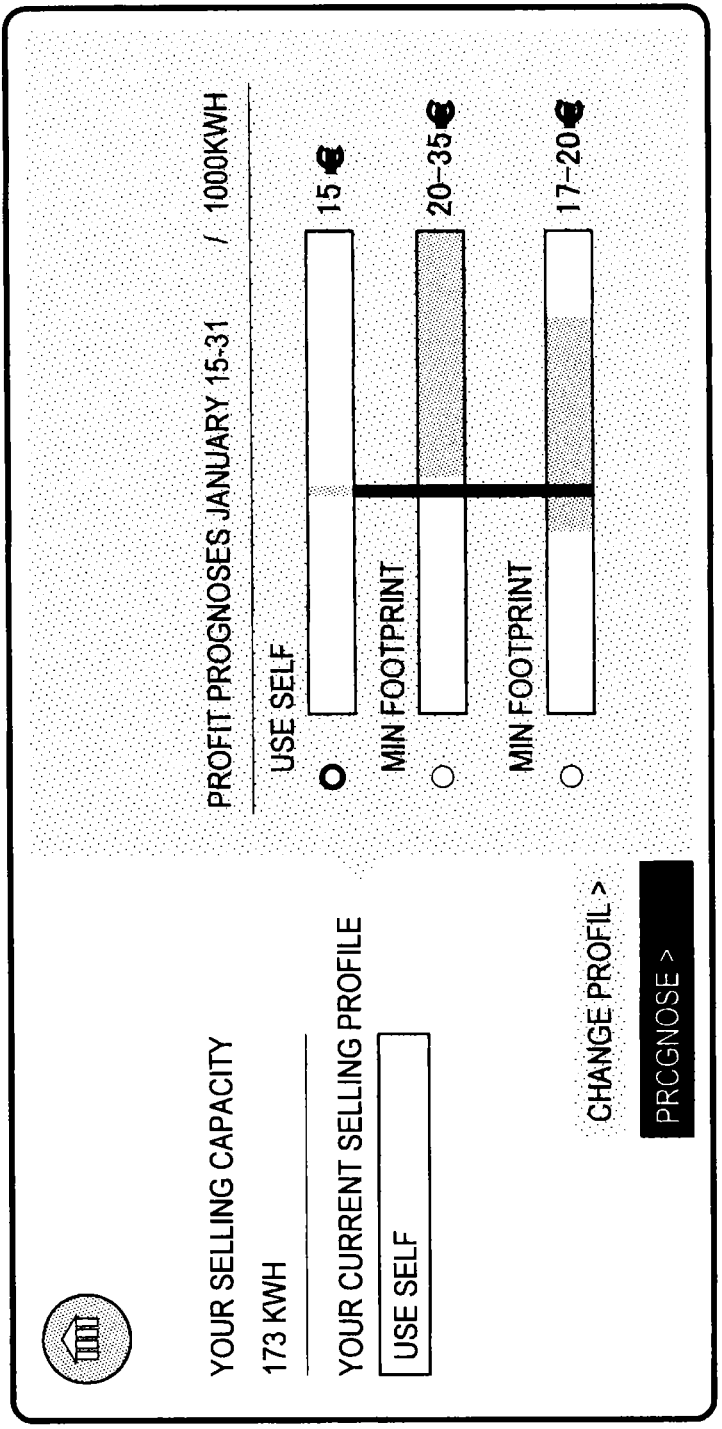
FIG. 2 is an explanatory view showing an operation screen configuration example of an energy transaction management system.

Further, the controller 1013 displays information about energy transactions, information about a discharged amount or accumulated energy, information provided by the service providing system 1004, or information about the residual quantity of battery, the distance that can still be traveled and the like of the electric vehicle 1016 in the display unit 1015. The controller 1013 has an input unit (not shown) to input information provided therein. The user uses the input unit to input instructions into the controller 1013 of storage of energy in the accumulation apparatus 1014, use or sales of energy stored in the accumulation apparatus 1014, or use or sales of energy generated by the green generator 1011. As the input unit, for example, a user interface (transaction screen example) shown in FIG. 2 is used.

In the foregoing, the small-scale prosumers 1001 have been described.

(1-1-2: Service providing System 1004)

Next, the service providing system 1004 will be described in more detail. As shown in FIG. 1, the service providing system 1004 includes a service providing server 1041, an energy price prediction server 1042, and a transaction management server 1043.

The service providing server 1041, or collecting unit, collects information relating to amounts of energy stored by a plurality of members of prosumer group 1002, and also information relating to energy requirements of prosumer group 1002. For example, service providing server 1041 may collect information about generated energy or accumulated energy from the controller 1013 held by the individual small-scale prosumers 1001 or issues instructions to the controller 1013 concerning the transmission destination of energy generated by the green generator 1011 or the transmission destination of energy stored in the accumulation apparatus 1014. Further, the service providing server 1041 manages addition/deletion of the small-scale prosumer 1001 to/from the prosumer group 1002. The service providing server 1041 further manages information such as accumulated energy and generated energy inside the prosumer group 1002.

The energy price prediction server 1042, or prediction unit, may determine a price for the distribution of energy, such as to a non-member of prosumer group 1002. For example, energy price prediction server 1042 may predict the energy rate in the future from changes in price of energy whose transactions are carried out inside the prosumer group 1002. In this case, the energy price prediction server 1042 predicts the energy rate based on the energy rate presented by the energy supplier 1005 or market data of an external energy transaction market. The energy price prediction server 1042 may also be configured to be able to predict the energy rate on an external energy transaction market based on market data of the energy transaction market.

The transaction management server 1043, or managing unit, determines the price at which transactions regarding distribution of energy should be carried out inside the prosumer group 1002. That is, transaction management server 1043 may determine whether to supply energy, such as to a non-member of prosumer group 1002, at the determined price. Transaction management server 1043 accepts a selling order or purchase order input by the individual small-scale prosumers 1001 via the controller 1013, and manages the success or failure of transactions, based on factors such as the determined price if a transaction is made via the service providing server 1041, the transaction management server 1043 may determine whether to supply energy at a determined price, and issue instructions, to the controller 1013 of the small-scale prosumer 1001 that has placed a selling order, to distribute energy, such as to another member or non-member of prosumer group 1002. Transaction management server 1043 may also issue instructions to the controller 1013 of the small-scale prosumer 1001 that has placed a purchase order to receive energy.

In the foregoing, the service providing system 1004 has been described.

(1-2: Energy Management Method Using Electronic Vehicle 1016)

Figure 3:
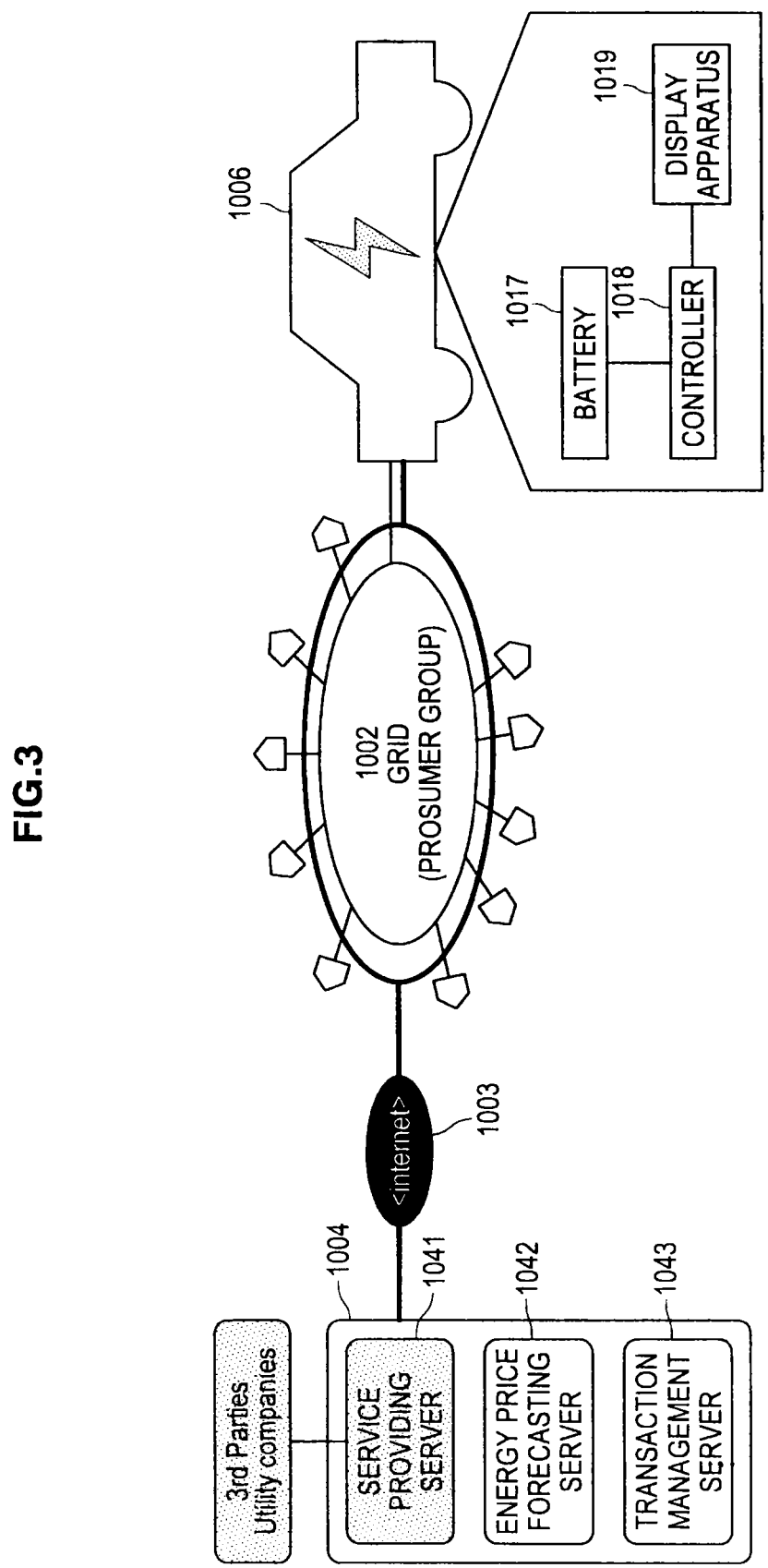
FIG. 3 is an explanatory view showing an energy management method using batteries of an electronic vehicle.

Next, the energy management method using the electronic vehicle 1016 will be described with reference to FIG. 3. FIG. 3 is an explanatory view illustrating the energy management method using the electronic vehicle 1016. As the electronic vehicle 1016, for example, an electric car, electric bike, electric bicycle, electric ship, or electric plane can be raised.

As shown in FIG. 3, the electronic vehicle 1016 has a battery 1017, a controller 1018, and a display unit 1019 mounted thereon. The electronic vehicle 1016 uses energy stored in the battery 1017 to operate a driving mechanism (not shown). The electronic vehicle 1016 is constructed so that energy of the battery 1017 can be transmitted to the outside by receiving control of the controller 1018. Like the controller 1013 held by the small-scale prosumers 1001, the controller 1018 can communicate with the service providing system 1004. The controller 1018 also transmits accumulated energy of the battery 1017 to the service providing system 1004.

When viewed from the whole prosumer group 1002, the battery 1017 of the electronic vehicle 1016 can be considered a very large energy storage system. Further, the electronic vehicle 1016 is movable and thus, the battery 1017 of the electronic vehicle 1016 can be considered an energy moving system. For example, a use form in which the electronic vehicle 1016 charged at home is moved to a shopping area or office to use energy of the battery 1017 at that place can also be considered. For the electronic vehicle 1016, however, there is a danger that the electronic vehicle 1016 may become unable to run on its own if energy of the battery 1017 is consumed in a place in which changing is unavailable. Therefore, it is necessary to pay attention to use of the battery 1017 of the electronic vehicle 1016.

Incidentally, the method of using the battery 1017 of the electronic vehicle 1016 is not limited to simply using energy at a movement destination and it is better to put use of energy of the battery 1017 for energy transactions in perspective. However, even the case where transactions of energy stored in the battery 1017 of the electronic vehicle 1016 are carried out is basically the same as the case where transactions of energy of the accumulation apparatus 1014 held by the small-scale prosumers 1001 are carried out. However, the case of the electronic vehicle 1016 is different from the case where energy of the accumulation apparatus 1014 or the like is used for transaction in that the electronic vehicle 1016 can be moved to an energy selling spot where energy can be sold. Thus, this point will be described.

As described above, the electronic vehicle 1016 can move to an energy selling spot. A case where energy is sold by transmitting energy to the energy selling spot from the battery 1017 of the electronic vehicle 1016 that has reached the energy selling spot will be considered. In this case, the electronic vehicle 1016 can sell surplus energy after leaving energy necessary to reach a charging spot of energy stored in the battery 1017. However, it is difficult for the user to correctly know how much energy is necessary to reach a charging spot. Thus, a mechanism to display electric energy that can be sold in an easily understandable manner to the user is demanded.

Figure 4:
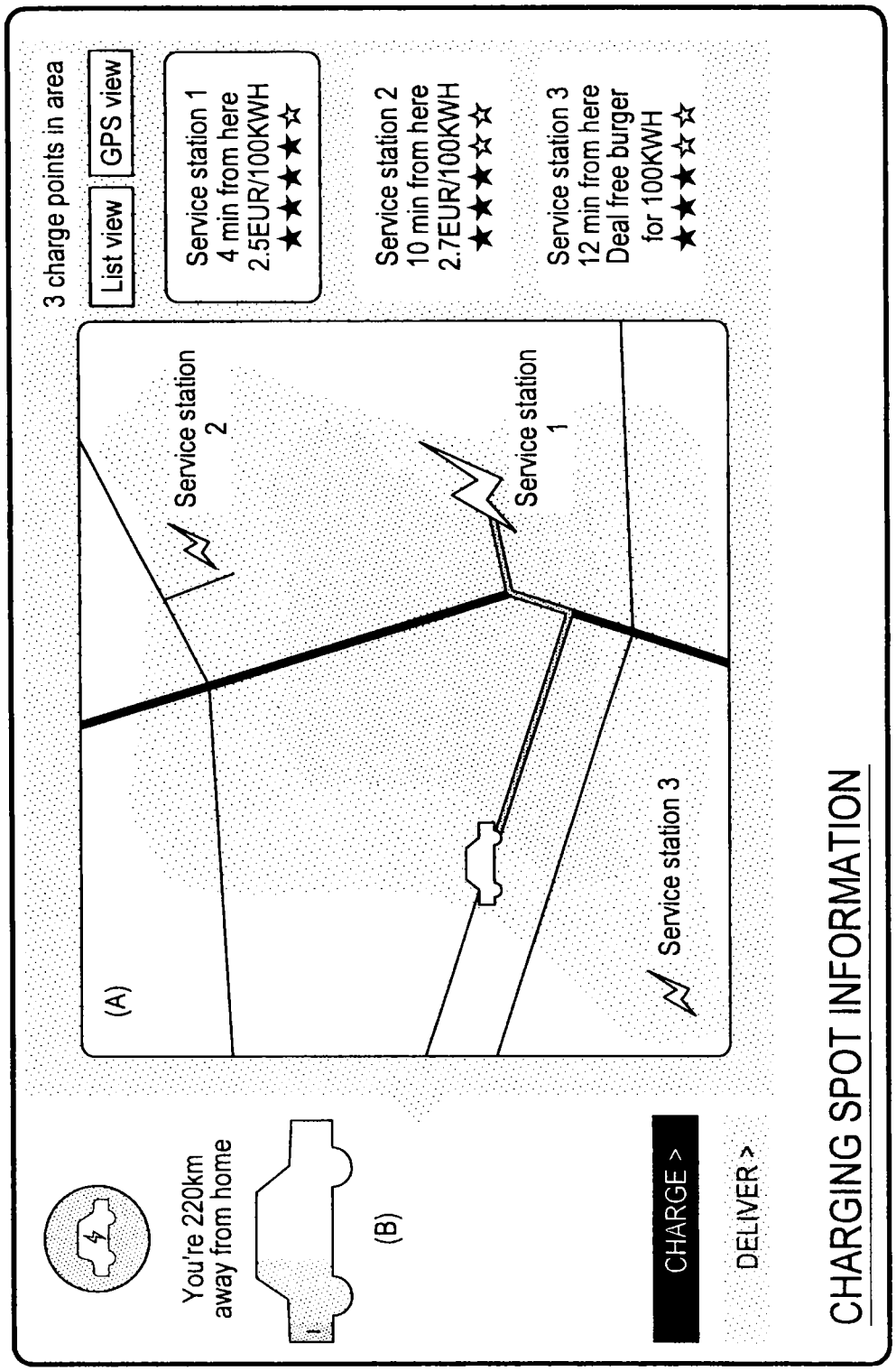
FIG. 4 is an explanatory view exemplifying a display method of charging spot information.
Figure 5:
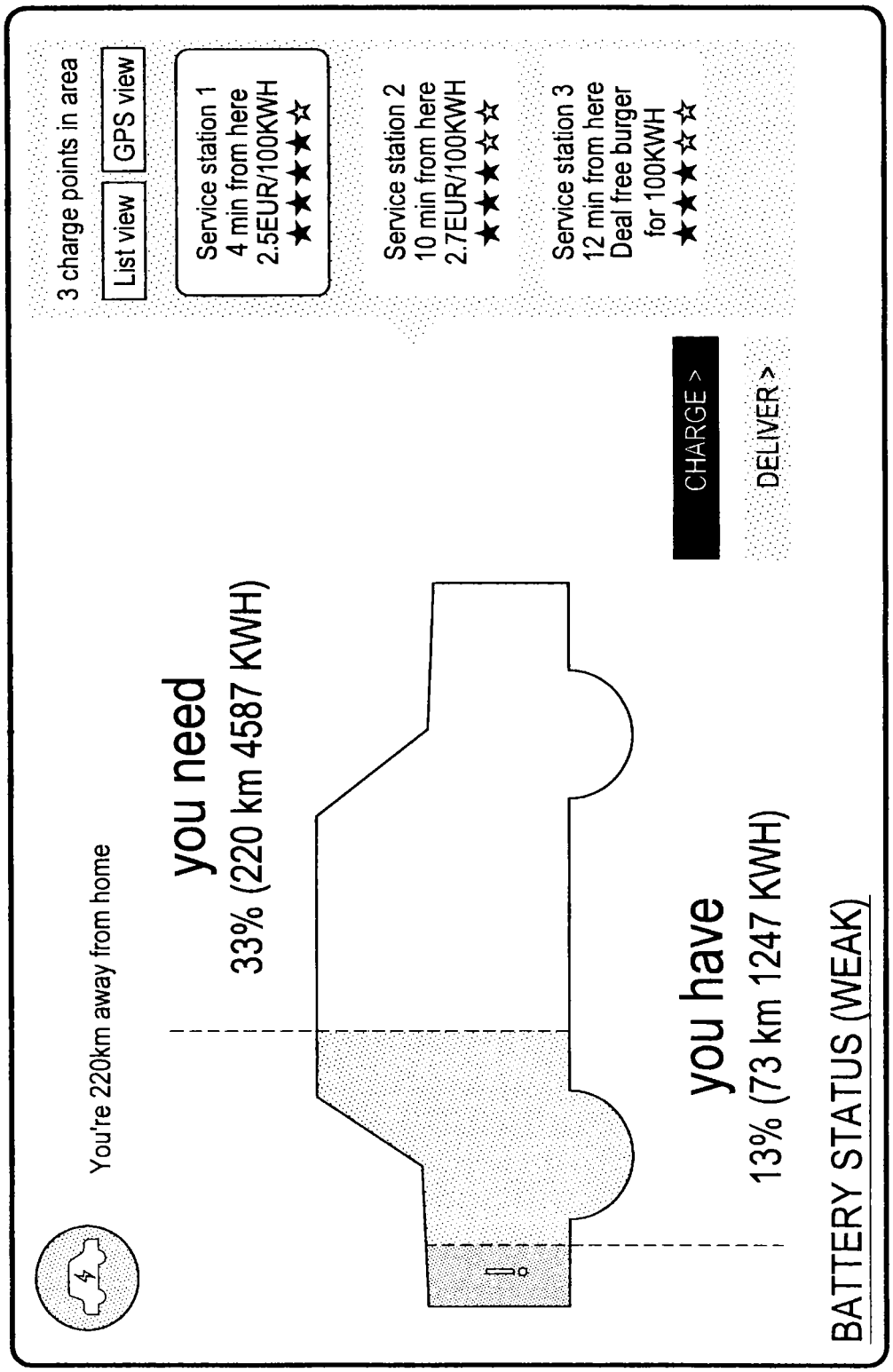
FIG. 5 is an explanatory view exemplifying the display method of the charging spot information.

Thus, the inventors of the present invention devised a display configuration as shown in FIGS. 4 to 7. FIG. 4 shows, in part A, information about charging spots relative to the current spot of the electronic vehicle 1016. FIG. 4 shows, in part B, the residual quantity of the battery 1017 and accumulated energy necessary for the electronic vehicle 1016 to reach a charging spot. FIG. 5 is an enlargement of part B of FIG. 4. An enlarged display like FIG. 5 may be made when the position of (B) on the screen of FIG. 4 is touched or clicked.

As shown in FIGS. 4 and 5, the user can easily know surplus energy by map information of charging spots relative to the current spot of the electronic vehicle 1016, reachable areas, the residual quantity of the battery 1017, and the residual quantity of the battery 1017 necessary to reach the nearest charging spot being shown to the user. However, the example in FIGS. 4 and 5 shows that there is no surplus energy and the residual quantity of the battery 1017 is in a state that does not allow the electronic vehicle 1016 to reach the nearest charging spot. In this case, it is necessary to charge the battery 1017 by some other means.

Figure 6:
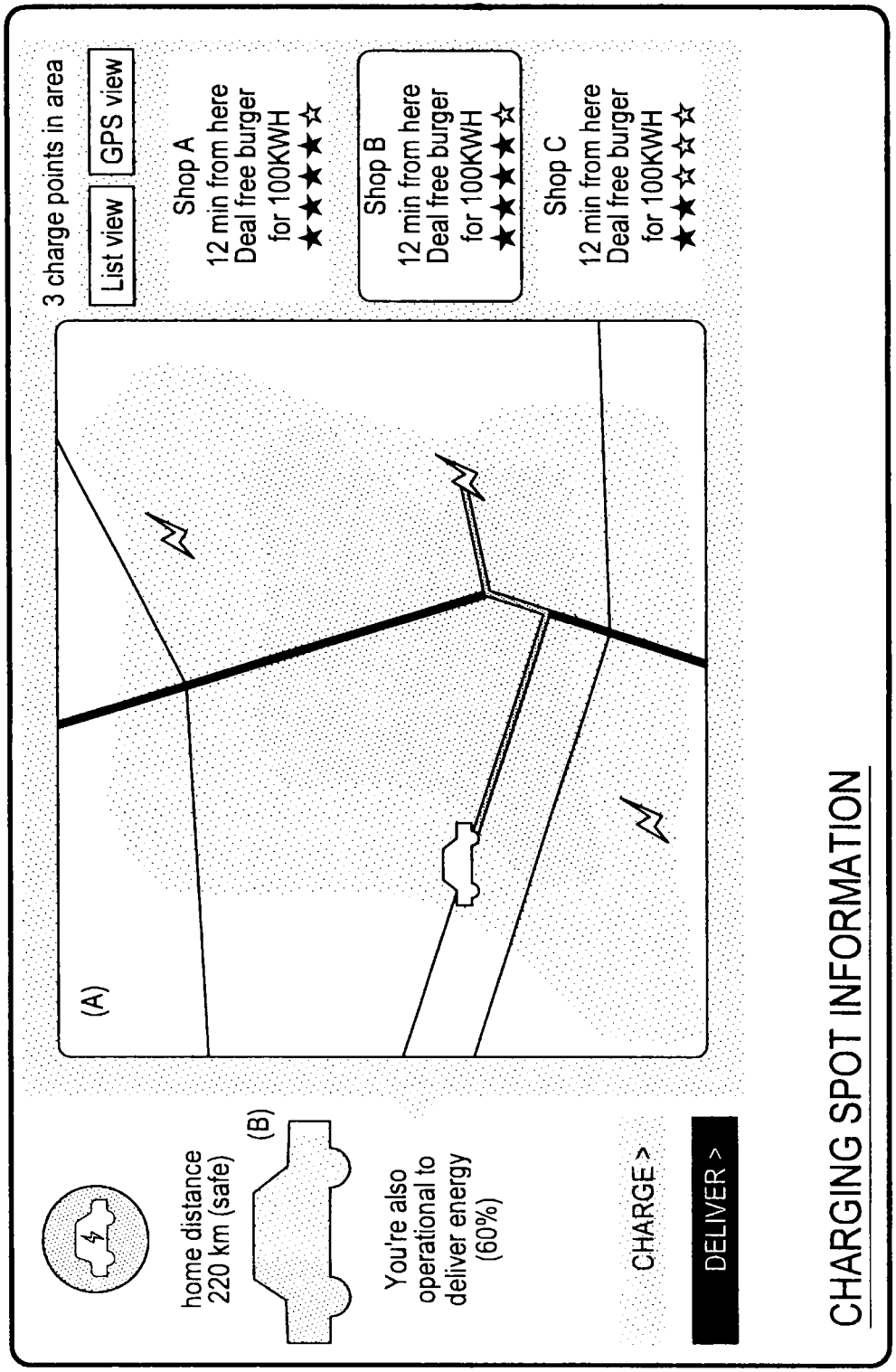
FIG. 6 is an explanatory view exemplifying the display method of battery status of the electronic vehicle.
Figure 7:
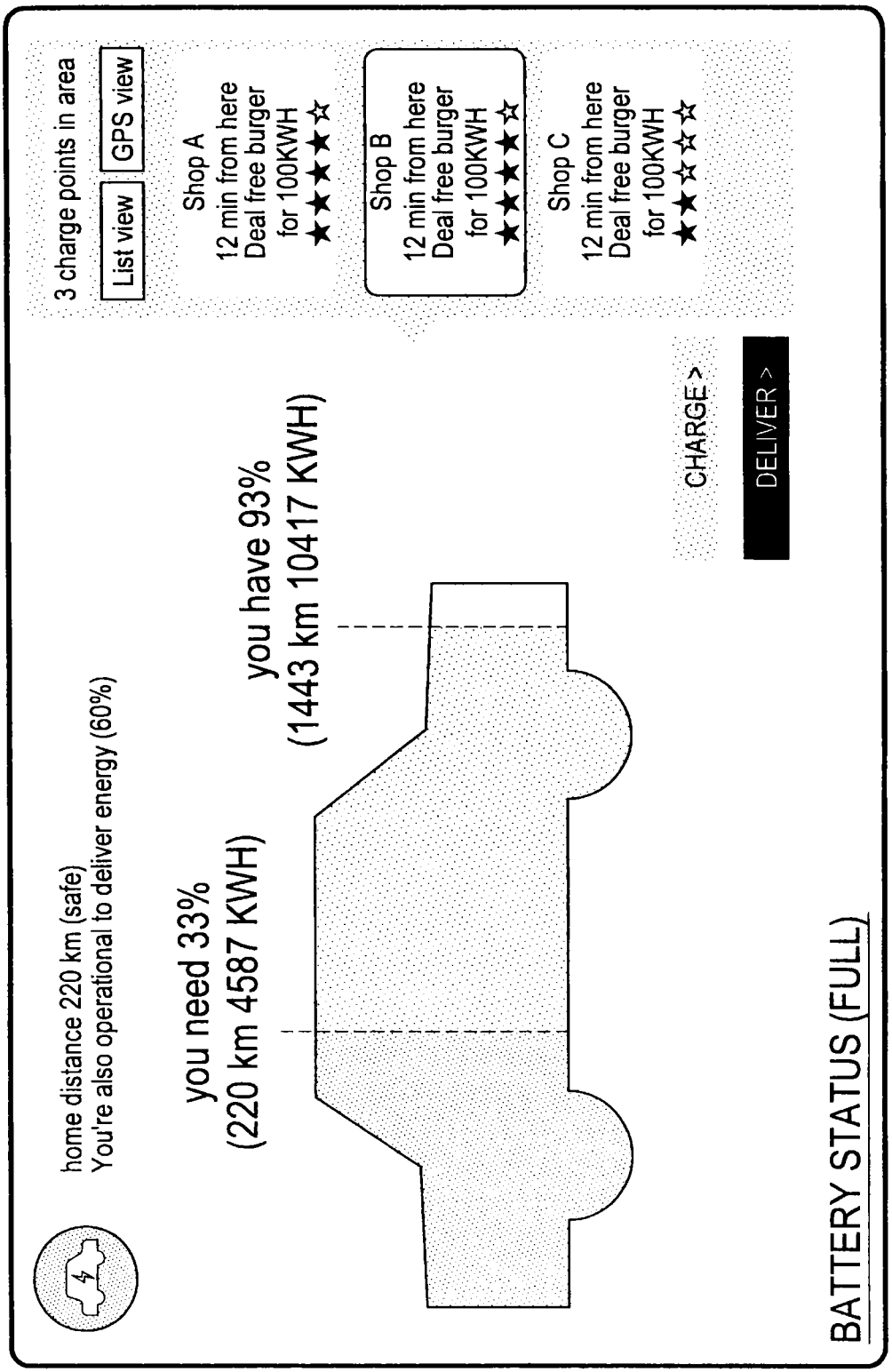
FIG. 7 is an explanatory view exemplifying the display method of the battery status of the electronic vehicle.

On the other hand, FIG. 6A shows information about energy selling spots relative to the current spot of the electronic vehicle 1016. FIG. 6B shows the residual quantity of the battery 1017 and surplus energy obtained by subtracting accumulated energy necessary for the electronic vehicle 1016 to reach a charging spot from the residual quantity. FIG. 7 is an enlargement of FIG. 6B. An enlarged display like FIG. 7 may be made when the position of (B) on the screen of FIG. 6 is touched or clicked. As shown in FIGS. 6 and 7, the user can easily know energy that can be sold by map information of energy selling spots relative to the current spot of the electronic vehicle 1016, the residual quantity of the battery 1017, and surplus energy obtained by subtracting the residual quantity of the battery 1017 necessary to reach the nearest charging spot being shown to the user.

The displays shown in FIGS. 4 to 7 may be configured to be switchable. Information indicating the current spot of the electronic vehicle 1016 is obtained by the electronic vehicle 1016 via a GPS or the like and sent to the service providing server 1041. Map information relative to the current spot thereof and information about charging spots and energy selling spots are acquired by the service providing server 1041. Further, information about movable areas based on the residual quantity of the battery 1017 is calculated by the service providing server 1041. Then, the map information, information about charging spots, information about energy selling spots, and information about movable areas are sent to the controller 1018 of the electronic vehicle 1016 and displayed in the display unit 1019.

In the foregoing, the energy management method using the electronic vehicle 1016 has been described.

As described above, by grouping and managing the small-scale prosumers 1001, energy generated by the green generator 1011 can be used efficiently and further transactions of energy can be carried out under relatively favorable conditions. Further, by placing the battery 1017 of the electronic vehicle 1016 under control, a new use form of energy, which is an energy transaction using a movement energy source, is created.

2: Second Embodiment

Next, a second embodiment will be described. The present embodiment concerns a configuration that enables the user to easily view the state of use of energy and supports the reduction in energy costs. However, the present embodiment provides a mechanism that not simply presents energy usage to the user, but' also analyzes the state of use of energy by the user to present an analysis result thereof to the user. The present embodiment also provides a mechanism that makes improvement proposals of the user environment based on the analysis result or recommends a method of improving efficiency in energy use.

By providing such a mechanism, reference information to solve questions such as how much energy a device uses wastefully, which devices should be replaced by other devices, how much energy efficiency is improved if replaced by other devices, and how much capital investment is effective are obtained. Moreover, by allowing energy control of devices to be automatically exercised using the above analysis results, when compared with a case where the user manually replaces devices or limits energy use, higher energy saving is achieved. Also, energy use can be made more efficient based on information not easily available to the user.

(2-1: Configuration of Energy Management System 2000)

Figure 8:
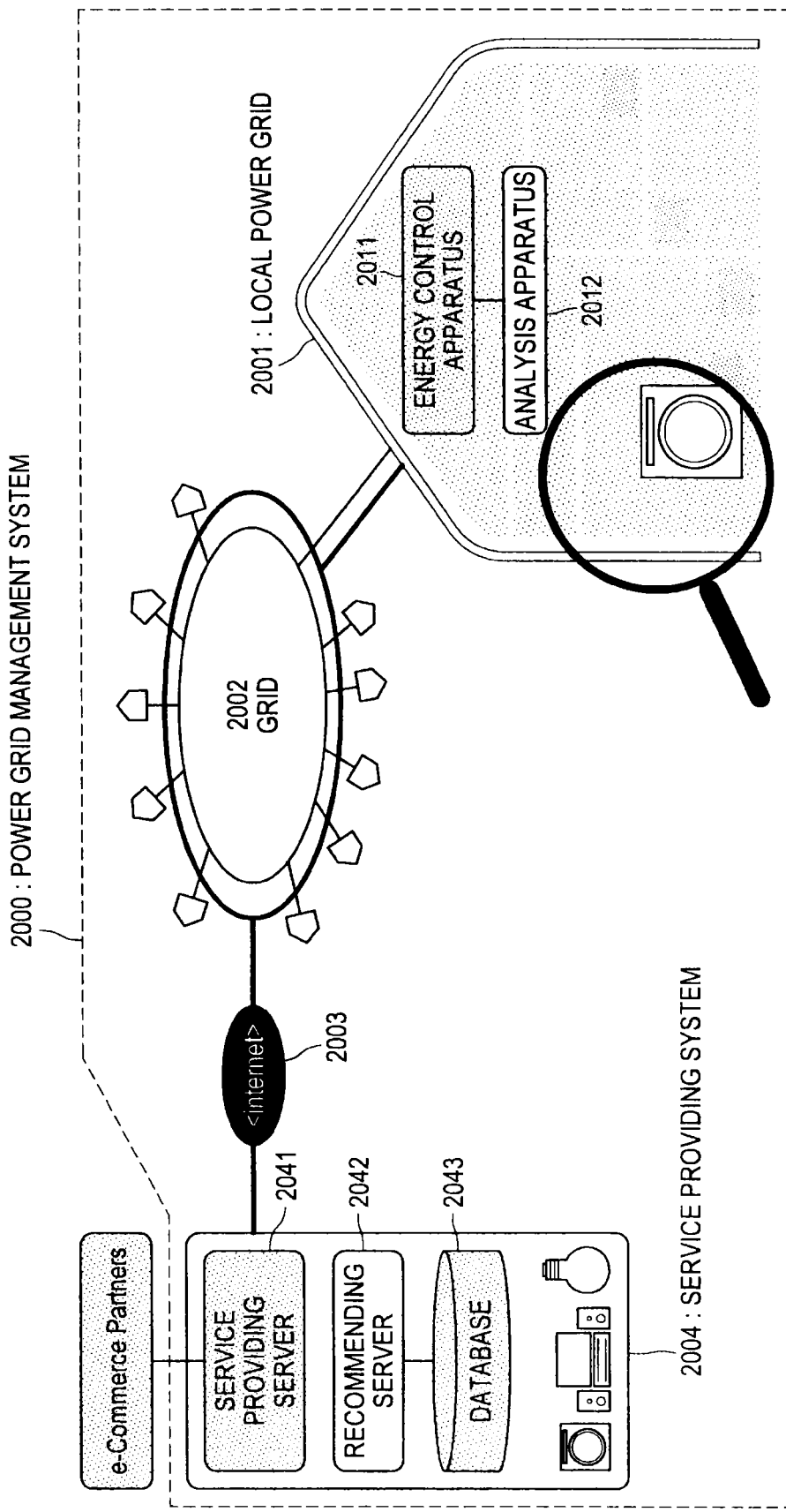
FIG. 8 is an explanatory view showing a configuration example of an energy grid management system.

First, the configuration of an energy grid control system 2000 according to the present embodiment will be described with reference to FIG. 8 and a method of analyzing the state of use of energy by the user will be described therein. As shown in FIG. 8, the energy grid control system 2000 includes a local energy grid 2001, an energy grid 2002, a wide-area network 2003, and a service providing system 2004. In the example in FIG. 8, different numerals and names are given to components substantially the same as those in the first embodiment to make an understanding of technical content in the present embodiment easier.

As shown in FIG. 8, the local energy grid 2001 includes an energy control apparatus 2011 and an analyzer 2012. The energy control apparatus 2011 is a control unit that controls energy supply to some device inside the local energy grid 2001. If an accumulation unit is contained in the local energy grid 2001 as a device, the energy control apparatus 2011 also controls charging and discharging. The analyzer 2012 is a unit that acquires information (hereinafter, device information) about energy usage of devices connected to the local energy grid 2001, use time zones, life time of devices, energy efficiency of devices and the like to analyze the acquired device information.

The energy control apparatus 2011 and the analyzer 2012 are connected to the service providing system 2004 via the wide-area network 2003. The energy control apparatus 2011 transmits device information to the service providing system 2004. The analyzer 2012 transmits analysis results to the service providing system 2004. Such device information analysis results are received by a service providing server 2041 present in the service providing system 2004.

As shown in FIG. 8, the service providing system 2004 includes the service providing server 2041, a recommendation server 2042, and a database 2043. The service providing system 2004 collects device information in the local energy grid 2001 transmitted from the energy control apparatus 2011. The service providing server 2041 controls the energy control apparatus 2011 based on the collected device information and to exercise energy control of each device in the local energy grid 2001.

The recommendation server 2042 presents a recommended energy management pattern or devices to be replaced to the user based on analysis results received from the analyzer 2012 via the service providing server 2041. In doing this, the recommendation server 2042 refers to information about devices stored in the database 2043. The database 2043 stores device information about existing devices of various brands. Thus, the recommendation server 2042 can recommend information about high-performance devices by comparing device collected by the energy control apparatus 2011 and device information stored in the database 2043.

For example, the recommendation server 2042 transmits information about a recommended energy management pattern or devices to be replaced to the analyzer 2012 to cause a display unit (not shown) of the analyzer 2012 to display the information. The recommendation server 2042 may also be encouraged to advertise recommended devices to the user in a tie-up with a mail-order house or the like of devices.

Figure 9:
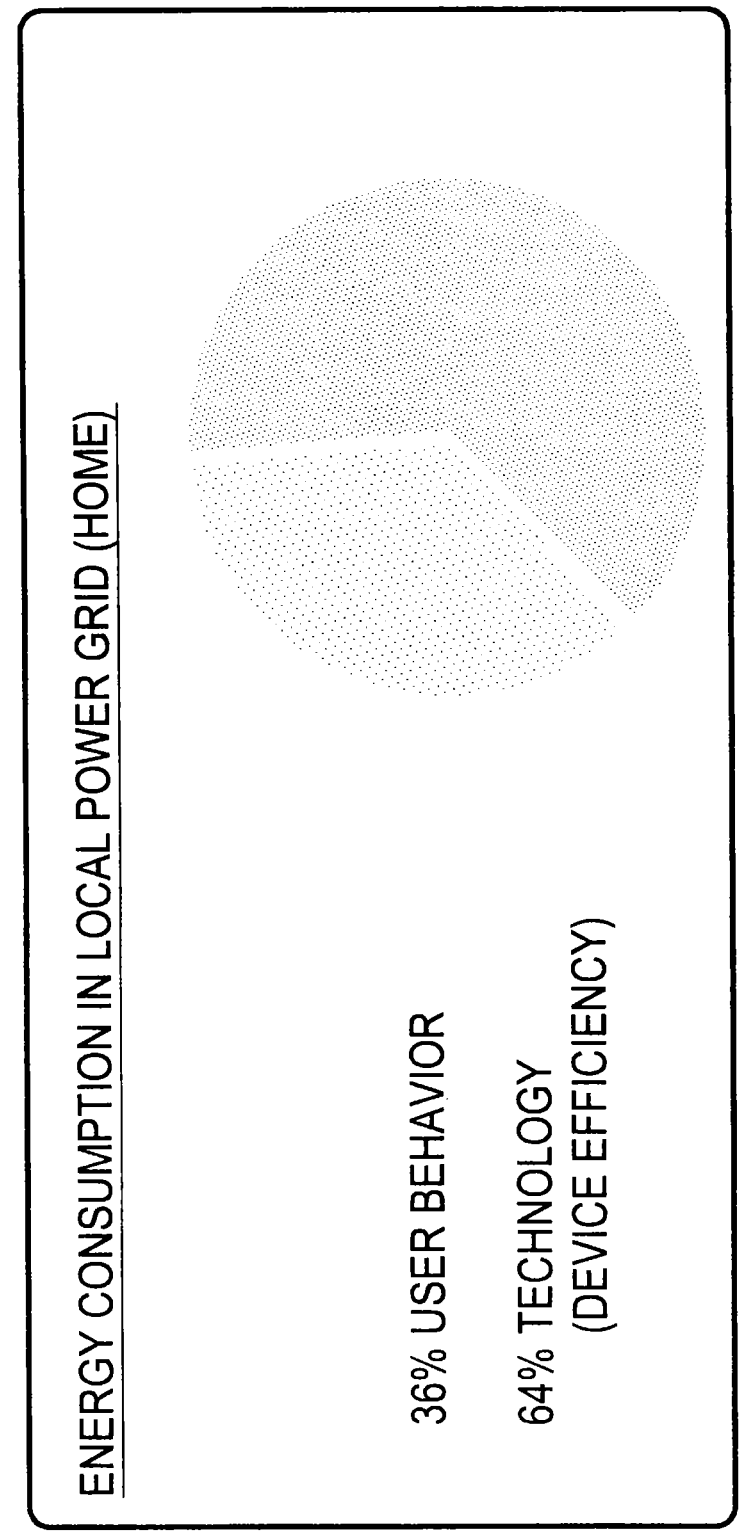
FIG. 9 is an explanatory view showing a breakdown of energy consumption in a local energy grid.
Figure 10:
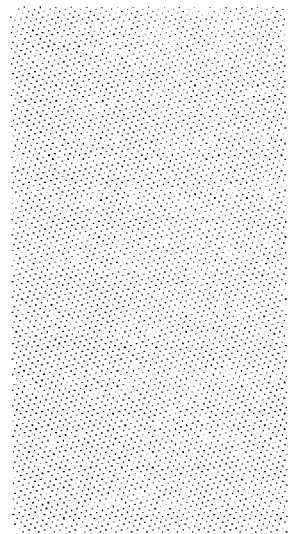
FIG. 10 is an explanatory view showing an effect of reducing energy consumption in the local energy grid.
Figure 11:
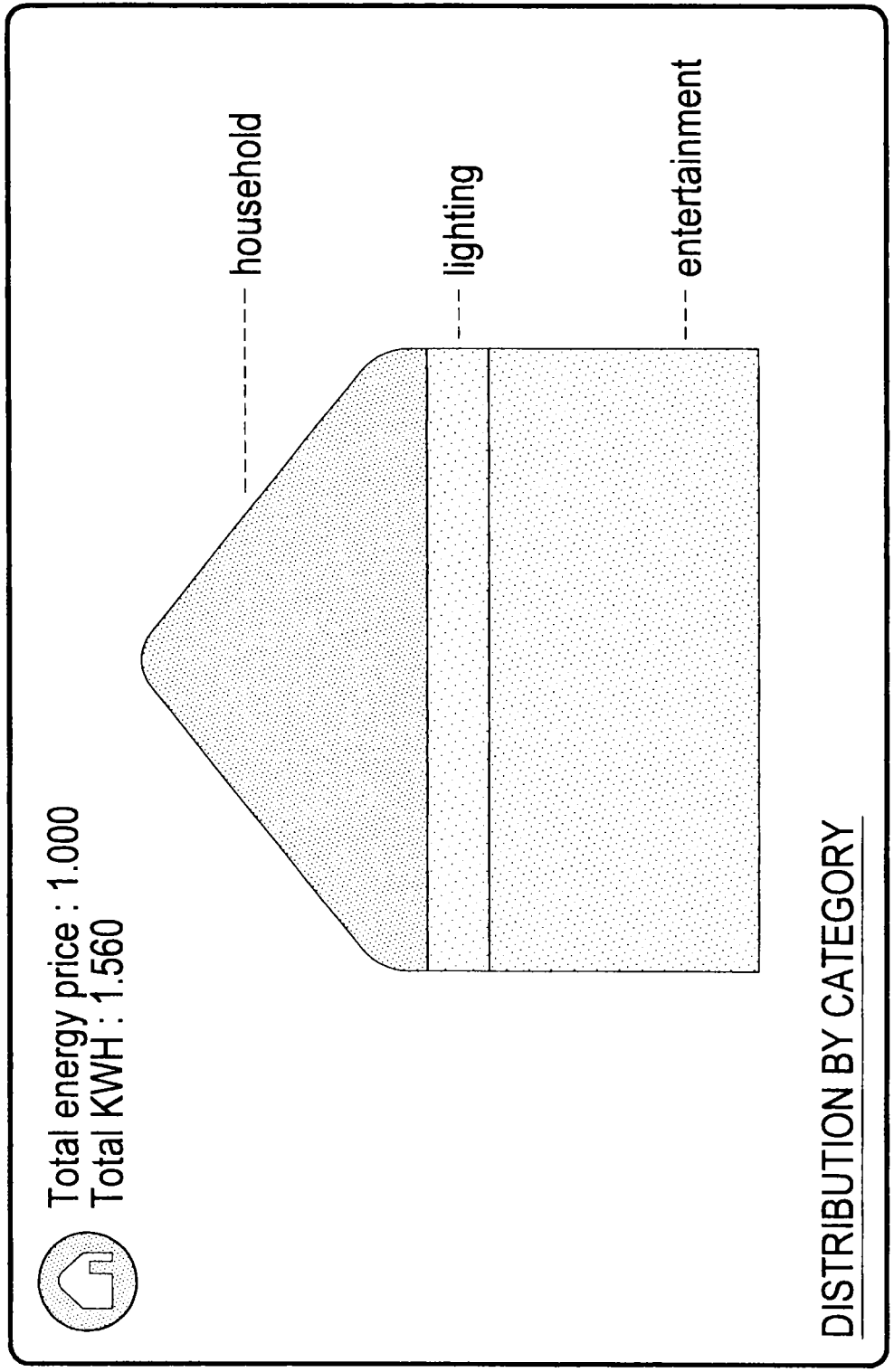
FIG. 11 is an explanatory view showing the distribution of energy consumption by category in the local energy grid.

For example, the methods shown in FIGS. 9 to 15 are known as display methods of energy information in the local energy grid 2001. FIG. 9 shows what factors decide energy consumption in the local energy grid 2001. FIG. 10 shows how much energy usage can be reduced in the local energy grid 2001. FIG. 11 shows energy consumption by category in the local energy grid 2001. Categories include, for example, household appliances, lighting, and entertainment (for example, video devices and music players).

Figure 12:
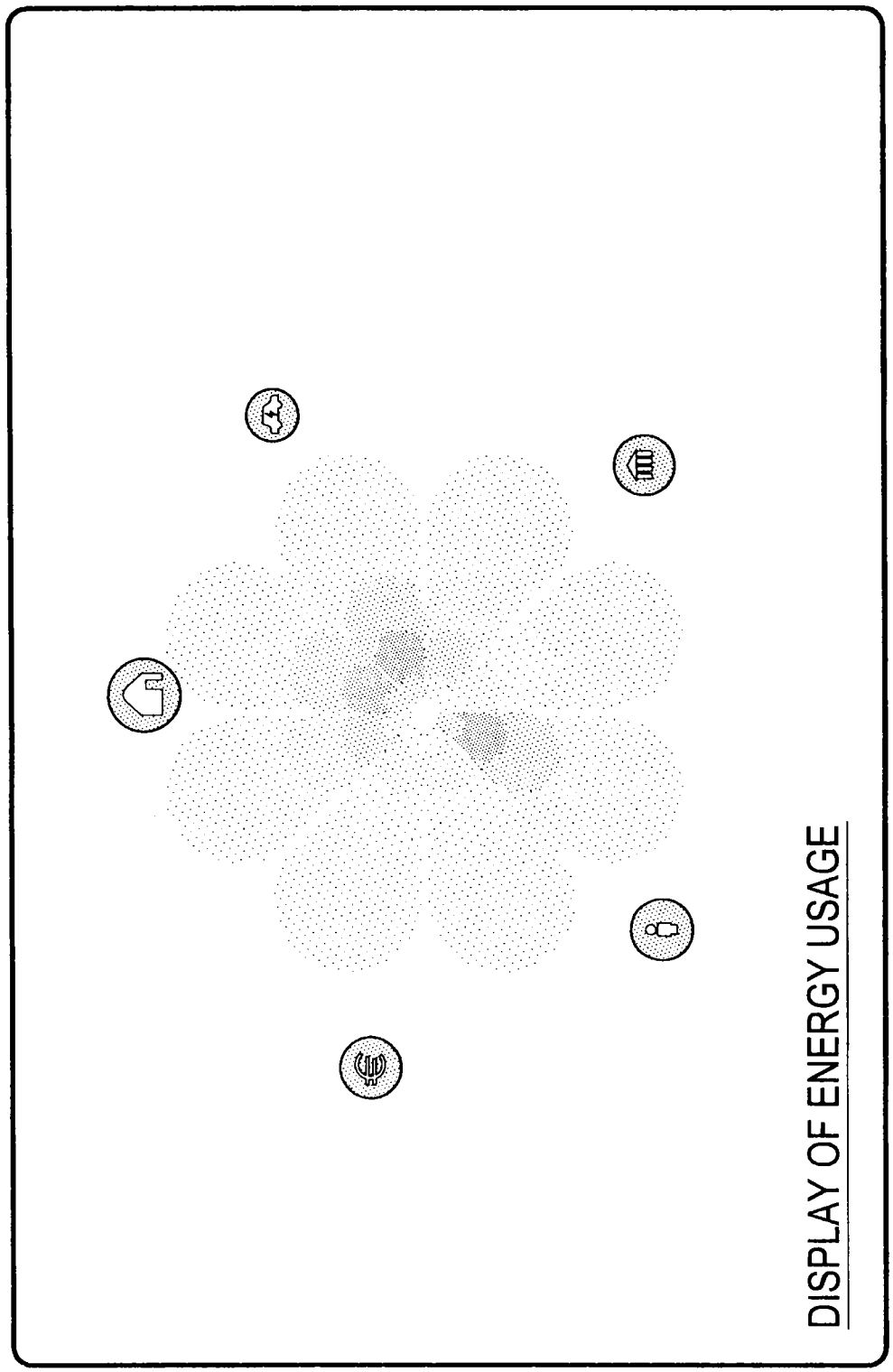
FIG. 12 is an explanatory view showing a display configuration example of energy uses in the local energy grid.
Figure 13:
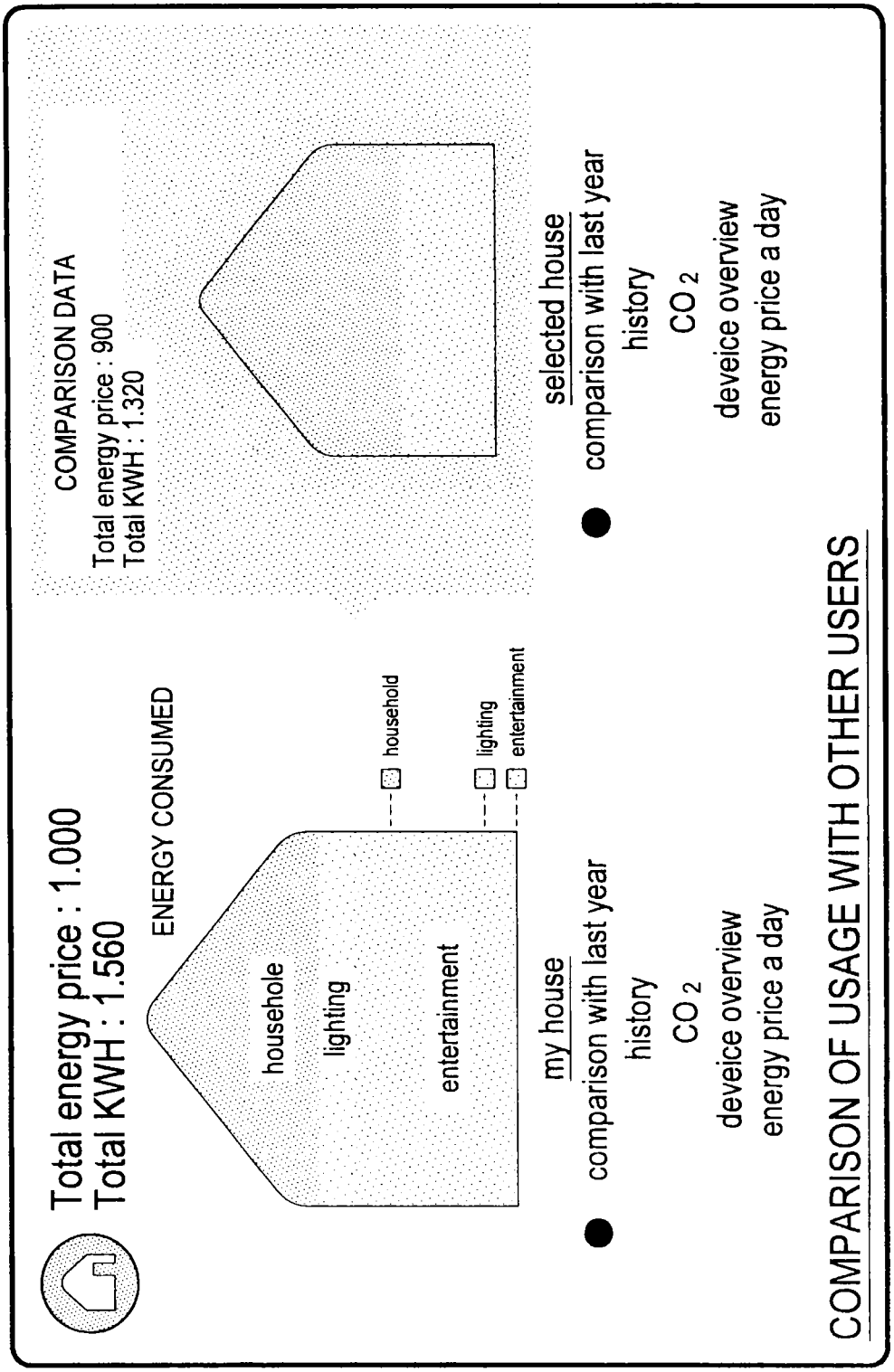
FIG. 13 is an explanatory view showing a comparison result of energy consumed in the local energy grid of another user.
Figure 14:
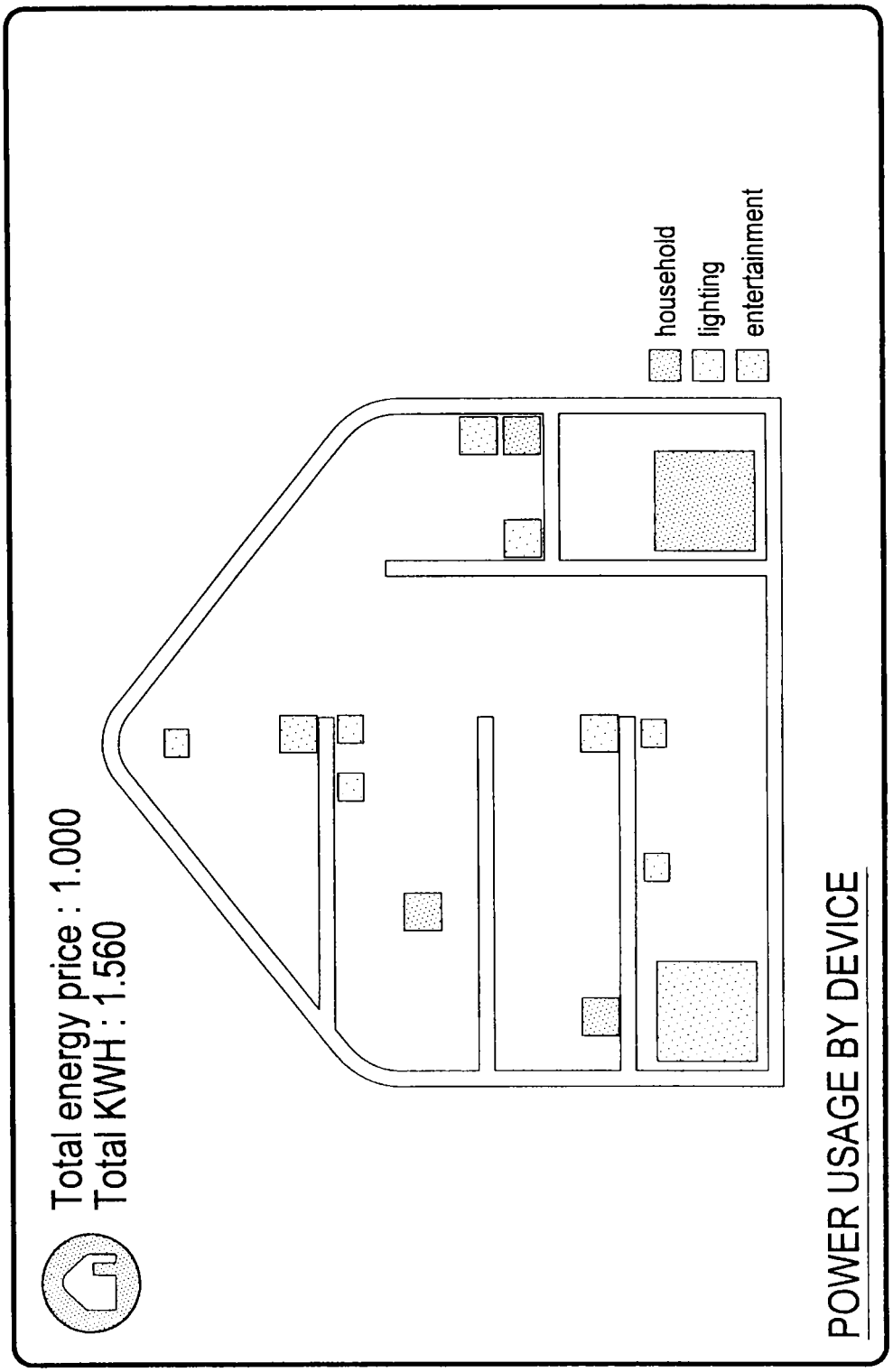
FIG. 14 is an explanatory view showing energy usage by device.

FIG. 12 shows a display configuration visually representing energy uses. FIG. 13 shows a comparison with energy usage in the local energy grid 2001 of another user. FIG. 14 shows energy usage by device in the local energy grid 2001. With the installation locations and uses of devices clearly shown as in FIG. 14, it is obvious to the user which device to replace and to which device to pay attention to keep watch on energy consumption.

Figure 15:
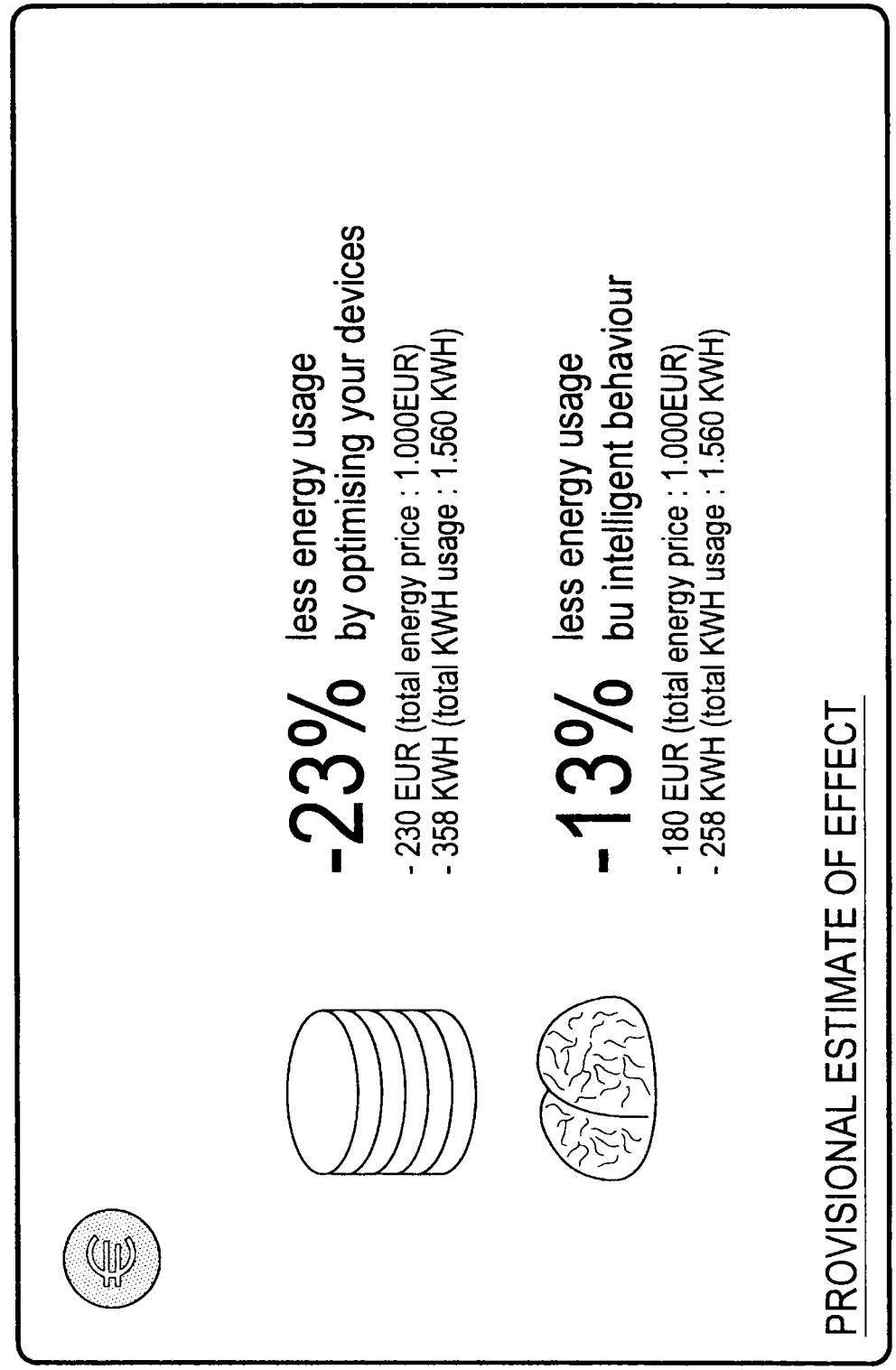
FIG. 15 is an explanatory view showing a provisional estimate result of effect by energy management.
Figure 16:
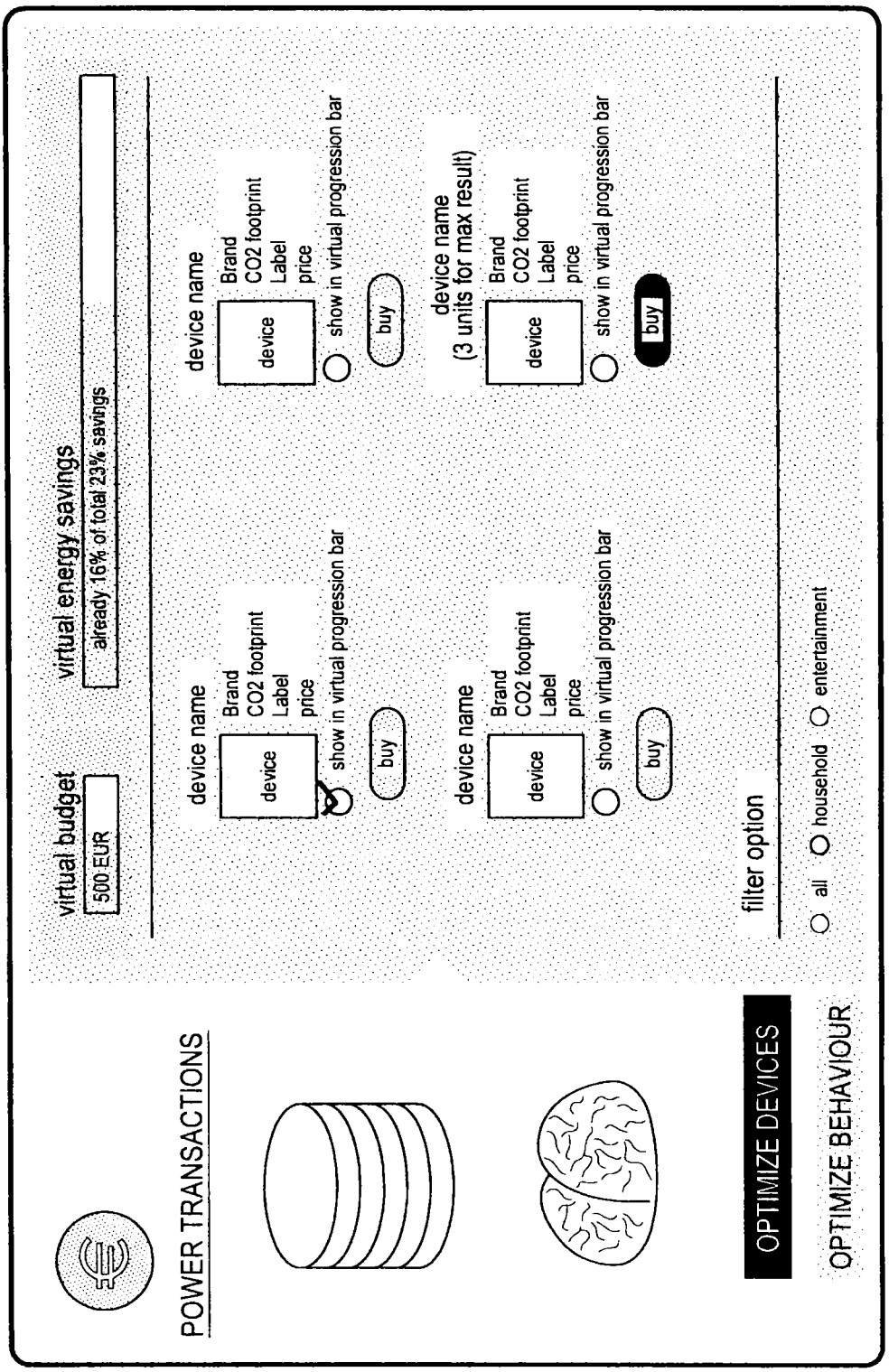
FIG. 16 is an explanatory view showing a configuration example of a user interface used for energy transactions.

FIG. 15 compares efficiency when the user attempts to efficiently use energy manually and when the user automatically promotes efficient energy uses by using analysis results by the analyzer 2012. Thus, it becomes evident by applying the analysis method that it is more efficient to automatically exercise energy control of each device by the energy control apparatus 2011 using analysis results than to diligently turn on and turn off devices manually by the user. FIG. 16 shows a user interface for selling energy used when energy transactions are carried out.

3: Third Embodiment (3-1: Efficient Environment Control)

Figure 17:
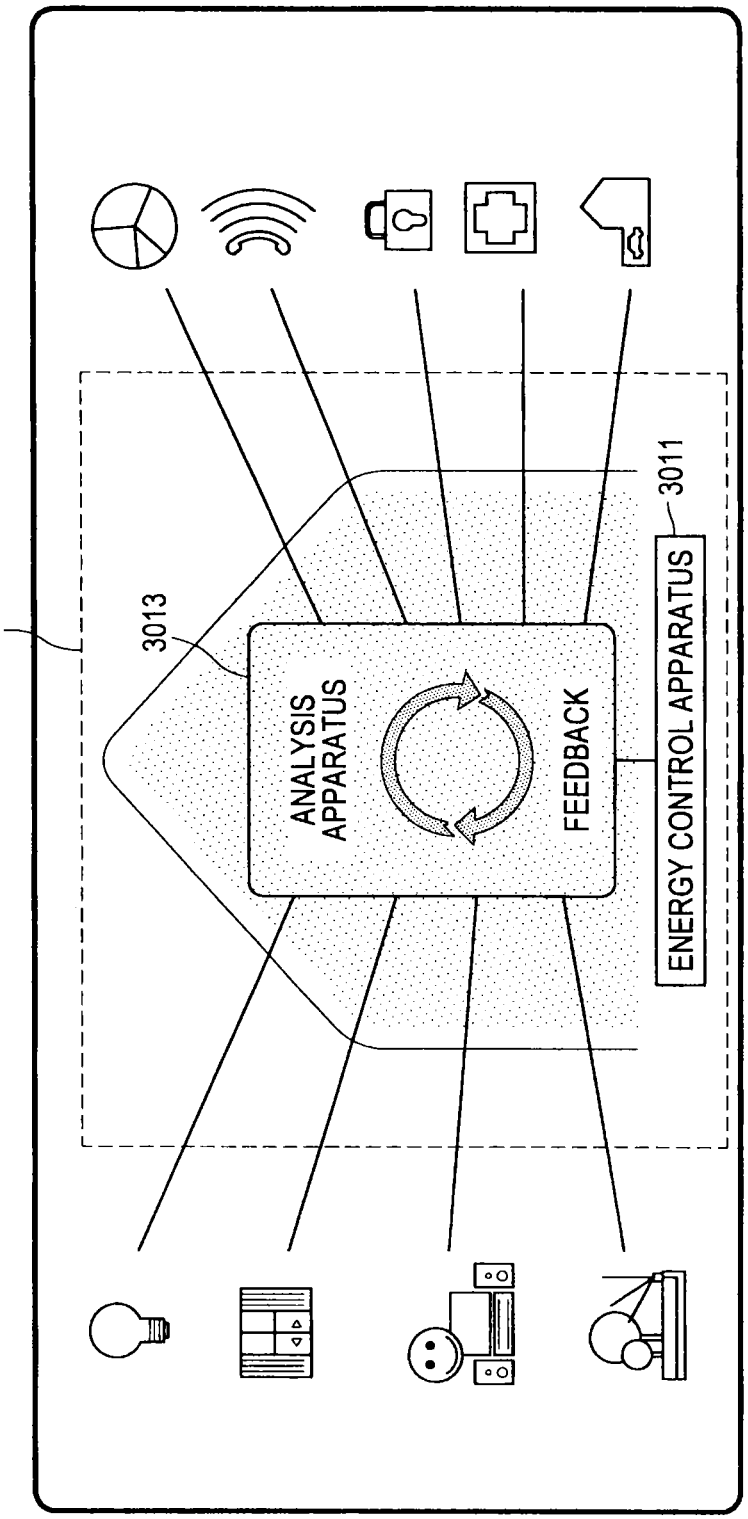
FIG. 17 is an explanatory view illustrating the configuration of the local energy grid.
Figure 18:
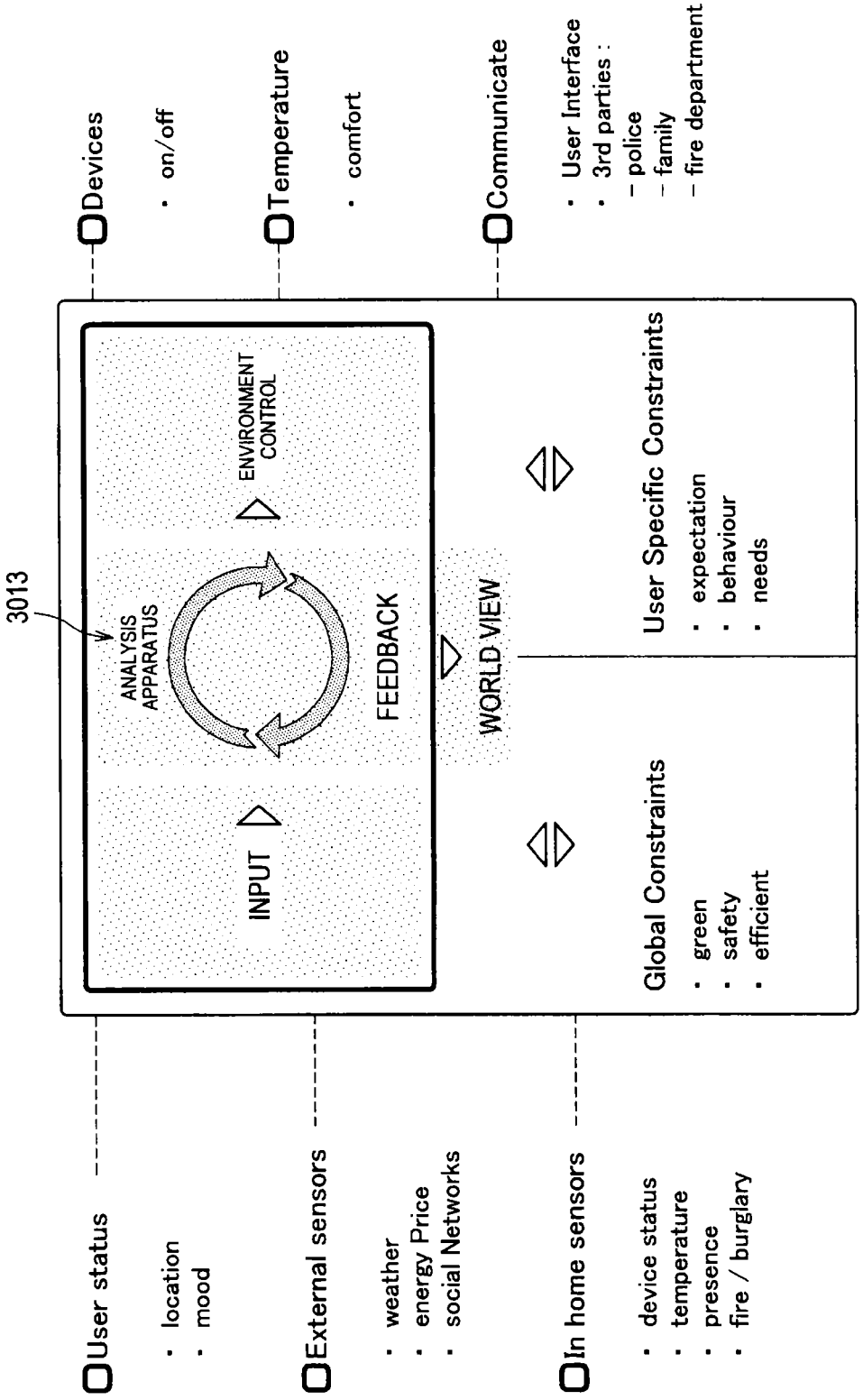
FIG. 18 is an explanatory view illustrating the configuration of the local energy grid.

A local energy grid 3001 according to the present embodiment will be described with reference to FIGS. 17 and 18. FIGS. 17 and 18 are explanatory views illustrating the local energy grid 3001 according to the present embodiment.

The local energy grid 3001 according to the present embodiment includes, as illustrated in FIG. 17, an energy control apparatus 3011 and an analyzer 3013. The local energy grid 3001 according to the present embodiment has one or a plurality of electronic devices (not shown) whose energy supply is managed by the energy control apparatus 3011 provided therein. The local energy grid 3001 also has various green generators (not shown) and an accumulation apparatus (not shown) to store energy generated by the green generators provided therein. The local energy grid 3001 also has various sensors to acquire information about the installation environment in which the local energy grid 3001 is installed provided therein.

The green generator is an energy generation unit that generates energy derived from renewable energy or an energy generation unit that generates energy by using resources of low environmental load. Examples of the green generator include, for example, photovoltaic energy generators, wind turbine generators, geothermal energy generators, fuel cells, biomass energy generators, and atomic energy generators.

The accumulation apparatus stores energy generated by green generators or transmits such energy to the other local energy grid 3001.

The energy control apparatus 3011 also controls electronic devices, green generators, and the accumulation apparatus provided in the local energy grid 3001.

The analyzer 3013 has a function of acquiring information about electronic devices present inside the local energy grid 3001, information about the installation environment of the energy grid and/or information about transactions of energy generated in the energy grid. The analyzer 3013 analyzes conditions of use and the state of use of electronic devices connected to the energy grid based on the acquired information and setting information (for example, setting information set by the user) for the energy grid. The analyzer 3013 also controls electronic devices based on analysis results via the energy control apparatus 3011.

The local energy grid 3001 uses these apparatuses to monitor or analyze various kinds of information or to behave based on analysis results. Energy is controlled by saving energy. Various kinds of comfort, pleasure, or entertainment can be provided to the user. Moreover, safety is provided and monitored by providing various kinds of security to the user and others. Services of medical care/health care can also be provided. Further, communication with third parties can be promoted via various external servers or the like.

FIG. 18 illustrates various kinds of information acquired by the analyzer 3013 together. The analyzer 3013 analyzes detected/acquired information (input information) based on global restrictions or user characteristics set by the user and controls devices or the environment based on an analysis result thereof. The analyzer 3013 can also make various analyses based on statistical data or the like acquired from outside and also make heuristic analyses using various kinds of history information of acquired data.

4: Hardware Configuration Example

Figure 19:
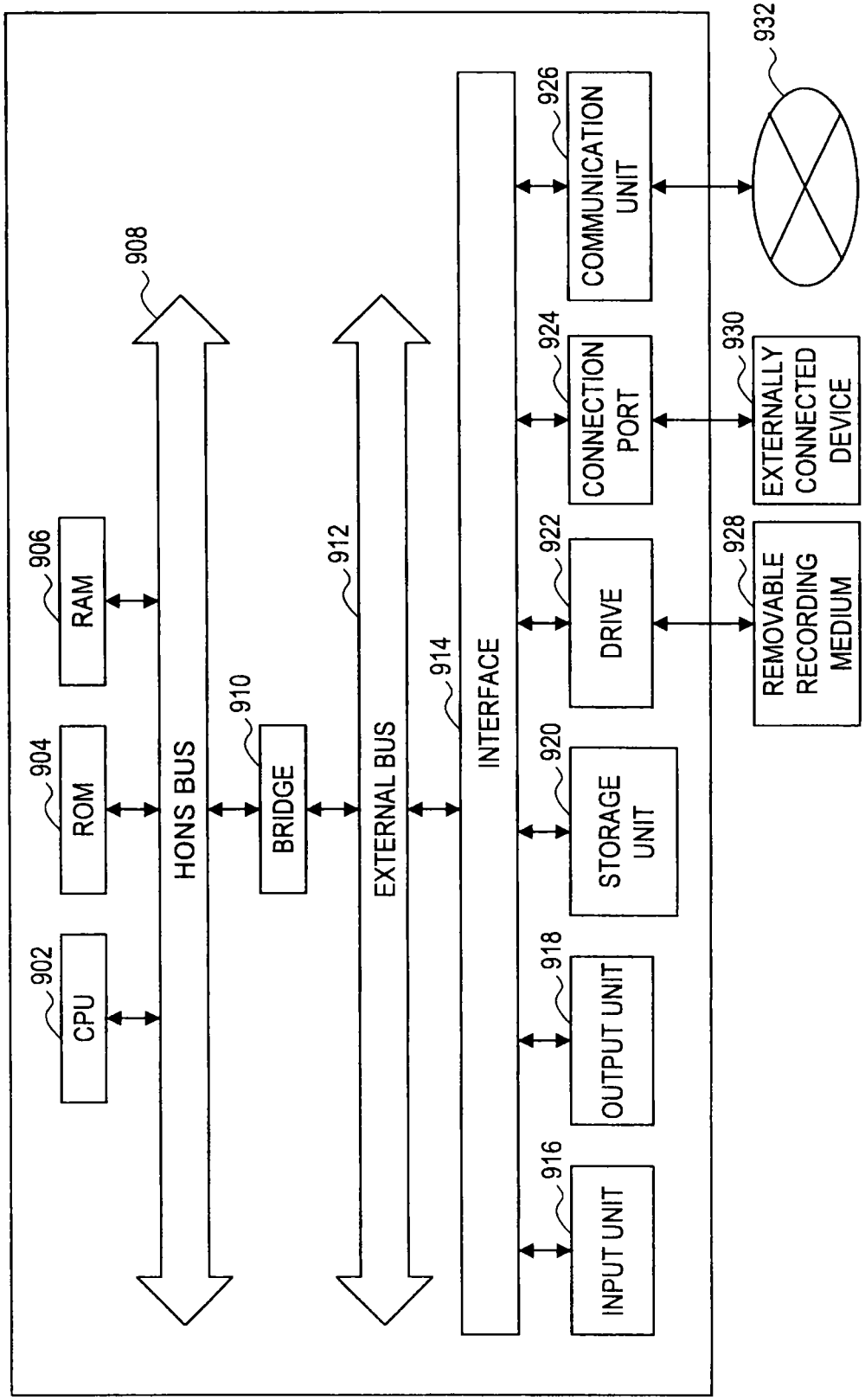
FIG. 19 is an explanatory view showing a hardware configuration example.

The function of each component held by the controllers 1013, 1018 and the service providing system 1004 can be realized by using, for example, the hardware configuration of the information processing apparatus shown in FIG. 19. That is, the function of each component is realized by controlling the hardware shown in FIG. 19 using a computer program. The form of the hardware is arbitrary and, for example, a mobile information terminal such as a personal computer, mobile phone, PHS, and PDA, a game machine, and various home information appliances are contained therein. The PHS is an abbreviation of Personal Handyphone System. The PDA is an abbreviation of Personal Digital Assistant.

As shown in FIG. 19, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an IC card on which a non-contact IC chip is mounted or an electronic device. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

It should be understood by those skilled in the art that various modifications, combinations, sub-combinations and alterations may occur depending on design requirements and other factors insofar as they are within the scope of the appended claims or the equivalents thereof.

In the above description, the management method, transaction method, analysis method and the like mainly intended for energy have been described, but the technical scope of the present invention is not necessarily limited to energy and is similarly applicable to the management method, transaction method, analysis method and the like of other energy.

REFERENCE SIGNS LIST

1000 Virtual energy generation/storage system
1001 Small-scale prosumer
1011 Green generator
1012 Energy control apparatus
1013 Controller
1014 Accumulation apparatus
1015 Display unit
1016 Electronic vehicle
1017 Battery
1018 Controller
1019 Display unit
1002 Prosumer group
1003 Wide-area network
1004 Service providing system
1041 Service providing server
1042 Energy price prediction server
1043 Transaction management server
1005 Energy supplier
2000 Energy grid control system
2001 Local energy grid
2011 Energy control apparatus
2012 Analyzer
2002 Energy grid
2003 Wide-area network
2004 Service providing system
2041 Service providing server
2042 Recommendation server
2043 Database

We claim:

1. An apparatus for managing a usage of energy by an electric vehicle as part of a prosumer group managed by a service providing system in a virtual energy generation and storage system, the electric vehicle having a display and a battery capable of storing the energy, the apparatus comprising:

circuitry configured to perform energy transactions of energy stored by the prosumer group in the virtual energy generation and storage system, wherein the circuitry for performing energy transactions of energy stored by the prosumer group is further configured to acquire information about a position of the electric vehicle, a selected destination of the electric vehicle, and an amount of the energy stored in the battery;

transmit the position of the electric vehicle to the service providing system managing the prosumer group;

receive map information relative to the position of the electric vehicle, information about charging spots, and information about energy selling spots from the service providing system managing the prosumer group;

receive, from the service providing system of the prosumer group, a price for the distribution of energy to a non-member of the prosumer group at an energy selling spot;

determine an amount of the energy needed to reach the selected destination;

perform a comparison between the amount of the energy needed to reach the selected destination and the amount of the energy stored in the battery;

in a case where a result of the comparison corresponds to the energy stored in the battery being less than the amount of energy needed to reach the selected destination, control a display to display a plurality of charging spots; and in a case where a result of the comparison corresponds to the energy stored in the battery being greater than the amount of energy needed to reach the selected destination, the circuitry is further configured to control the display to display a plurality of energy selling spots;

control the display to display an amount of surplus electric energy to be sold stored in the electric vehicle, wherein displaying the amount of surplus electric energy to be sold stored in the electric vehicle includes simultaneously displaying an indication of the comparison, a location of at least one energy selling spot within a current driving range of the position of the electric vehicle, and a numeric indication of the current driving range in a single display screen; and transfer the amount of surplus electric energy stored in the electric vehicle from the battery to the energy selling spot where the surplus electric energy is sold from the electric vehicle to the energy selling spot at the price for the distribution of energy to the non-member of the prosumer group, wherein the surplus electric energy stored in the electric vehicle is transferred to an electric device, other than the electric vehicle itself, corresponding to the energy selling spot.

2. The apparatus of claim 1, wherein the circuitry is further configured to control the display to display a current driving range of the electric vehicle.

3. The apparatus of claim 1, wherein the circuitry is configured such that the indication comprises an indication of an amount of a difference between the amount of the energy needed to reach the selected destination and the amount of the energy stored in the battery, the difference being shown relative to an entire capacity of the battery.

4. The apparatus of claim 1, wherein the circuitry is configured such that the indication of the location comprises a map display.

5. The apparatus of claim 1, wherein the circuitry is configured such that the indication of the location comprises a list display.

6. The apparatus of claim 5, wherein the circuitry is configured such that the indication of the location is switchable between the list display and a map display.

7. A method for managing a usage of energy by an electric vehicle as part of a prosumer group managed by a service providing system in a virtual energy generation and storage system, the electric vehicle having a display and a battery capable of storing the energy, the method comprising:

performing energy transactions of energy stored by the prosumer group in the virtual energy generation and storage system, wherein performing energy transactions of energy stored by the prosumer group includes acquiring, through circuitry, information about a position of the electric vehicle, a selected destination of the electric vehicle, and an amount of the energy stored in the battery;

transmitting the position of the electric vehicle to the service providing system managing the prosumer group;

receiving map information relative to the position of the electric vehicle, information about charging spots, and information about energy selling spots from the service providing system managing the prosumer group;

receiving, from the service providing system of the prosumer group, a price for the distribution of energy to a non-member of the prosumer group at an energy selling spot;

determining an amount of the energy needed to reach the selected destination;

performing a comparison between the amount of the energy needed to reach the selected destination and the amount of the energy stored in the battery;

in a case where a result of the comparison corresponds to the energy stored in the battery being less than the amount of energy needed to reach the selected destination, controlling the display to display a plurality of charging spots; and in a case where a result of the comparison corresponds to the energy stored in the battery being greater than the amount of energy needed to reach the selected destination, controlling a display to display a plurality of energy selling spots;

controlling the display to display an amount of surplus electric energy to be sold stored in the electric vehicle, wherein displaying the amount of surplus electric energy to be sold stored in the electric vehicle includes simultaneously displaying an indication of the comparison, a location of at least one energy selling spot within a current driving range of the position of the electric vehicle, and a numeric indication of the current driving range in a single display screen; and transferring the amount of surplus electric energy to be sold stored in the electric vehicle from the battery to the energy selling spot where the surplus electric energy is sold from the electric vehicle to the energy selling spot at the price for the distribution of energy to the non-member of the prosumer group, wherein the surplus electric energy stored in the electric vehicle is transferred to an electric device, other than the electric vehicle itself, corresponding to the energy selling spot.

8. The method of claim 7, further comprising displaying, on the display, a current driving range.

9. The method of claim 7, wherein said displaying comprises displaying an indication of an amount of a difference between the amount of the energy needed to reach the selected destination and the amount of the energy stored in the battery, the difference being shown relative to an entire capacity of the battery.

10. The method of claim 7, wherein the indication of the location comprises a map display.

11. The method of claim 7, wherein the indication of the location comprises a list display.

12. The method of claim 11, wherein the indication of the location is switchable between the list display and a map display.

13. A non-transitory computer-readable storage medium storing instructions which, when executed by a processor, cause a computer to perform a method comprising:
  performing energy transactions of energy stored by a prosumer group in a virtual energy generation and storage system, wherein performing energy transactions of energy stored by the prosumer group includes
    acquiring information about a position of an electric vehicle, a selected destination of the electric vehicle, and an amount of the energy stored in a battery of the electric vehicle;
    transmitting the position of the electric vehicle to the service providing system managing the prosumer group;
    receiving map information relative to the position of the electric vehicle, information about charging spots, and information about energy selling spots from the service providing system managing the prosumer group;
    receiving, from the service providing system of the prosumer group, a price for the distribution of energy to a non-member of the prosumer group at an energy selling spot;
    determining an amount of the energy needed to reach the selected destination;
    performing a comparison between the amount of the energy needed to reach the selected destination and the amount of the energy stored in the battery;
    in a case where a result of the comparison corresponds to the energy stored in the battery being less than the amount of energy needed to reach the selected destination, controlling a display to display a plurality of charging spots; and
    in a case where a result of the comparison corresponds to the energy stored in the battery being greater than the amount of energy needed to reach the selected destination,
      controlling the display to display a plurality of energy selling spots;
      controlling the display to display an amount of surplus electric energy to be sold stored in the electric vehicle, wherein displaying the amount of surplus electric energy to be sold stored in the electric vehicle includes simultaneously displaying an indication of the comparison, a location of at least one energy selling spot within a current driving range of the position of the electric vehicle, and a numeric indication of the current driving range in a single display screen; and
      transferring the amount of surplus electric energy to be sold stored in the electric vehicle from the battery to the energy selling spot where the surplus electric energy is sold from the electric vehicle to the energy selling spot at the price for the distribution of energy to the non-member of the prosumer group, wherein the surplus electric energy stored in the electric vehicle is transferred to an electric device, other than the electric vehicle itself, corresponding to the energy selling spot.

14. The storage medium of claim 13, wherein the method further comprises displaying, on the display, a current driving range.

15. The storage medium of claim 13, wherein said displaying comprises displaying an indication of an amount of a difference between the amount of the energy needed to reach the selected destination and the amount of the energy stored in the battery, the difference being shown relative to an entire capacity of the battery.

16. The storage medium of claim 13, wherein the indication of the location comprises a map display.

17. The storage medium of claim 13, wherein the indication of the location comprises a list display.

18. The storage medium of claim 17, wherein the indication of the location is switchable between the list display and a map display.

19. The apparatus of claim 1, wherein the electric device is another electric vehicle.

20. The apparatus of claim 1, wherein the electric device is a battery.

\* \* \* \* \*